(12) United States Patent
Anderson et al.

(10) Patent No.: US 7,176,918 B2
(45) Date of Patent: *Feb. 13, 2007

(54) THREE-DIMENSIONAL PAINT PROJECTION WEIGHTING OF DIFFUSE AND SCATTERED ILLUMINATION METHODS AND APPARATUS

(75) Inventors: John R. Anderson, San Anselmo, CA (US); Manuel Kraemer, Emeryville, CA (US)

(73) Assignee: Pixar, Emeryville, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 139 days.

(21) Appl. No.: 11/084,211

(22) Filed: Mar. 18, 2005

(65) Prior Publication Data
US 2005/0179687 A1 Aug. 18, 2005

Related U.S. Application Data

(63) Continuation-in-part of application No. 10/428,322, filed on Apr. 30, 2003, now Pat. No. 7,019,744.

(60) Provisional application No. 60/624,705, filed on Nov. 2, 2004, provisional application No. 60/572,253, filed on May 17, 2004.

(51) Int. Cl.
*G06T 15/50* (2006.01)

(52) U.S. Cl. .................. 345/426; 345/424

(58) Field of Classification Search ............... None
See application file for complete search history.

(56) References Cited

U.S. PATENT DOCUMENTS 5,710,876 A * 1/1998 Peercy et al. ............ 345/426

(Continued)

OTHER PUBLICATIONS

Drebin et al., "Volume Rendering," *ACM Computer Graphics*, vol. 22, No. 4, 1988, pp. 65-74.

(Continued)

*Primary Examiner*—Mark Zimmerman
*Assistant Examiner*—Enrique L. Santiago
(74) *Attorney, Agent, or Firm*—Townsend and Townsend and Crew LLP

(57) ABSTRACT

Methods for rendering an object includes determining diffuse illumination values for object surface points, associating a 3D grid including vertices with the object, mapping object surface points to vertices, determining diffuse illumination values for vertices from the diffuse illumination values for object surface points, low pass filtering diffuse illumination values for the vertices to determine illumination compensation values for the vertices, determining illumination compensation values for the object surface points from the illumination compensation values for the vertices, and determining compensated diffuse illumination values for the object surface points from a weighted combination of the diffuse illumination values and illumination compensation values for the surface points.

22 Claims, 11 Drawing Sheets

U.S. PATENT DOCUMENTS

| | | | |
|---|---|---|---|
| 5,936,629 | A | 8/1999 | Brown et al. |
| 6,226,005 | B1 | 5/2001 | La Ferriere |
| 6,456,405 | B2 | 9/2002 | Horikoshi et al. |
| 6,567,083 | B1* | 5/2003 | Baum et al. ............... 345/426 |
| 6,624,812 | B1 | 9/2003 | Collodi |
| 6,744,435 | B2 | 6/2004 | Zwicker et al. |
| 6,961,058 | B2* | 11/2005 | Guo et al. ................ 345/426 |
| 7,068,274 | B2* | 6/2006 | Welch et al. ............... 345/426 |
| 2003/0179197 | A1* | 9/2003 | Sloan et al. ............... 345/426 |
| 2004/0125103 | A1* | 7/2004 | Kaufman et al. .......... 345/419 |
| 2004/0263511 | A1* | 12/2004 | West et al. ................. 345/421 |

OTHER PUBLICATIONS

Jensen et al., "A Practical Model for Subsurface Light Transport," (Stanford University), *Proceedings of SIGGRAPH'2001*, 8 page total.

Jensen, "Images with Subsurface Scattering," [Online] Retrieved from the Internet: http://graphics.ucsd.edu~henrik/images/subsurf.html, printed Mar. 6, 2003, pp. 1-2.

Jensen, "A Practical Model for Subsurface Light Transport," [Online] Retrieved from the Internet: http://graphics.ucsd.edu/?henrik/papers/bssrdf/, printed Mar. 6, 2003, pp. 1-2.

Jensen, A Rapid Hierarchical Rendering Technique for Translucent Materials. Proceedings of SIGGRAPH'2002, 6 pages total.

Jensen, "Rendering Translucent Materials—Beyond the BRDF," Retrieved from the Internet:http://graphics.ucsd.edu/?henrik/papers/ET2001/, printed Mar. 6, 2003, p. 1.

Jensen, "A Rapid Hierarchical Rendering Technique for Translucent Materials, Hierarchical BSSRDF Evaluation," Retrieved from the Internet: http://graphics.ucsd.edu/-henrik/papers/fast_bssrdf/, printed Mar. 6, 2003, pp. 1-2.

Miesch et al., "Monte Carlo Approach for Solving The Radiative Transfer Equation Over Mountainous and Heterogeneous Areas", *Applied Optics*, Dec. 20, 1999, vol. 38, No. 36, pp. 7419-7430.

Pharr et al., "Monte Carlo Evaluation of Non-Linear Scattering Equations for Subsurfafce Reflection", (Stanford University), *Proceedings of SIGGRAPH 2000*, 10 pages total.

Stam, "Multiple Scattering as a Diffusion Process," Department of Computer Science, University of Toronto, Toronto, Canada.

* cited by examiner

THREE-DIMENSIONAL PAINT PROJECTION WEIGHTING OF DIFFUSE AND SCATTERED ILLUMINATION METHODS AND APPARATUS

BACKGROUND OF THE INVENTION

The present application is a continuation-in-part of and incorporates by reference for all purposes: application Ser. No. 10/428,322 filed Apr. 30, 2003 now U.S. Pat. No. 7,019,744. The present application also claims priority to and incorporates by reference for all purposes: Provisional Application No. 60/572,253 filed May 17, 2004 and Provisional Application No. 60/624,705 filed Nov. 2, 2004. The present application also incorporates by reference for all purposes: Application No. PCT/US04/08993 filed Mar. 23, 2004.

BACKGROUND OF THE INVENTION

The present invention relates to computer animation. More particularly, the present invention relates to techniques and apparatus for efficient rendering of objects that are specified to include translucent materials.

Throughout the years, movie makers have often tried to tell stories involving make-believe creatures, far away places, and fantastic things. To do so, they have often relied on animation techniques to bring the make-believe to "life." Two of the major paths in animation have traditionally included, drawing-based animation techniques and physical animation techniques.

Drawing-based animation techniques were refined in the twentieth century, by movie makers such as Walt Disney and used in movies such as "Snow White and the Seven Dwarfs" (1937) and "Fantasia" (1940). This animation technique typically required artists to hand-draw (or paint) animated images onto a transparent media or cels. After painting, each cel would then be captured or recorded onto film as one or more frames in a movie.

Physical-based animation techniques typically required the construction of miniature sets, props, and characters. The filmmakers would construct the sets, add props, and position the miniature characters in a pose. After the animator was happy with how everything was arranged, one or more frames of film would be taken of that specific arrangement. Physical animation techniques were developed by movie makers such as Willis O'Brien for movies such as "King Kong" (1933). Subsequently, these techniques were refined by animators such as Ray Harryhausen for movies including "Mighty Joe Young" (1948) and Clash Of The Titans (1981).

With the wide-spread availability of computers in the later part of the twentieth century, animators began to rely upon computers to assist in the animation process. This included using computers to facilitate drawing-based animation, for example, by painting images, by generating in-between images ("tweening"), and the like. This also included using computers to augment physical animation techniques. For example, physical models could be represented by virtual models in computer memory, and manipulated.

One of the pioneering companies in the computer animation (CA) industry was Pixar. Pixar is more widely known as Pixar Animation Studios, the creators of animated features such as "Toy Story" (1995) and "Toy Story 2" (1999), "A Bugs Life" (1998), "Monsters, Inc." (2001), "Finding Nemo" (2003), "The Incredibles" (2004), and others. In addition to creating animated features, Pixar developed computing platforms specially designed for CA, and CA software now known as RenderMan®. RenderMan® was particularly well received in the animation industry and recognized with two Academy Awards®.

RenderMan® software is used to convert graphical specifications of objects and convert them into one or more images. This technique is known in the industry as rendering. One specific portion of the rendering process is known as surface shading. In the surface shading process the software determines how much light is directed towards the viewer from the surface of objects in an image in response to the applied light sources.

For different types of object materials, however, the amount of light directed towards the viewer is more than the light reflected from the surface. Such types of materials include materials that are at least partially translucent in nature, such as plastic, skin, milk, and the like. Translucent materials may also include materials that are non-uniformly translucent, such as marble, jade, and the like, and may have sub-surface features. Compensation for subsurface scattering and other effects of translucency are deemed important for the realism of computer-generated imagery.

Techniques to compensate and to render translucent objects have previously been proposed and generally fall into two categories: surface based approaches, and stochastic ray tracing methods. Each of these approaches has significant shortcomings. Surface based approaches suffer from technical difficulties in the parametric representation of sample locations. Additionally, such approaches do not address the fundamental problem of representing an internal structure of the scattering media.

Stochastic ray tracing approaches can be used to solve the full physical problem, however such approaches are generally very time consuming. Another approach includes a finite element analysis through a hierarchical evaluation of a radiative transfer equation. Again such approaches are very computationally intensive. Because the present solutions to the problem of rendering objects of translucent materials is slow, animators using such rendering techniques cannot quickly see how the animation will look. Accordingly, the animators must often wait overnight to see the rendering results.

In light of the above, what is needed are efficient techniques to render translucent objects.

BRIEF SUMMARY OF THE INVENTION

The present invention relates to the field of computer animation. More particularly, the present invention relates to techniques and apparatus for efficient rendering of objects composed of translucent materials.

The techniques described below are based on an explicit representation of the subsurface illumination fluxes on a 3 dimensional grid. This representation allows the efficient spatial indexing of illumination samples from the unstructured geometry of the object. This representation allows the rendering engine to quickly solve the transport of diffuse illumination inside the translucent material with full representation of the internal structure.

The process described below includes the following phases: 1) evaluation of surface illumination on object, collection of surface illumination (diffuse reflection), determining of area weighting, and scattering properties on sample grids; 2) efficient determination of the diffuse radiative transfer on the sample grids; and 3) sampling the diffuse illumination during final rendering pass.

In this embodiment, the first phase is the illumination sampling pass. In this phase, the relevant light sources are evaluated on the surface of an object and the surface shading model is evaluated to determine the quantity of diffuse illumination (diffuse reflection) for each color channel. The diffuse illumination (diffuse reflection) at the surface are transmitted to the translucency solver, described below. Additionally, Cartesian solver grids are constructed which cover the bounding volume of the object sample points. The diffuse illumination/diffuse reflection values are inserted onto the solver grids where they are merged with other values. The merge process is accomplished by adding the representative sample area for the sample into one grid and simultaneously adding the product of the sample area and the illumination value are added into a second grid. Scattering properties such as attenuation and scattering length are also mapped onto grid structures using the same technique. For internal structures with varying scattering properties additional samples of these properties are added. During this phase the samples may be offset from the actual sample position using the surface normal to simulate the effects of an initial forward or an initial reverse scattering process before the illumination enters the diffuse solver.

The second phase of the process is the solution of the scattering pass itself. In this embodiment, the illumination and scattering properties are normalized by processing all of the grids with a short range dealiasing filter and diving the area weighted illumination and scattering property grids by the area grid value. The diffuse illumination compensation values are then solved by solving the elliptic radiative transfer equation (1) on the grid values. This process can be done efficiently in several ways. For example, in one approach the process is performed via a recursive low pass filter whose filter coefficients vary with scattering parameters across the grid in each direction for each dimension. The filter parameters are chosen so that the bidirectional filter impulse response approximates the Green's function of the scattering operator with the local scattering parameters. In another approach, the variable coefficient elliptic scattering equation is solved using a fast elliptic solver such as a fast convolution FFT solver or multi-grid solver.

The third phase of the process is to take the completed grid containing the solved diffuse illumination compensation values and point sample the grid using an interpolation kernel from the surface shaders. This may-occur during a final rendering pass for the surface. All of the sample processing for this phase is done in global 3-space so that no surface coordinate parameterizations are needed and smoothness across multiple geometry elements is provided.

According to one aspect of the invention, a method for rendering an object is described. One method includes determining diffuse illumination values for surface points on the object, associating a three-dimensional grid with the object, wherein the three-dimensional grid includes a plurality of vertices, wherein the plurality of vertices define a plurality of voxels, and wherein each voxel includes at least a portion of the object, and mapping surface points on the object to a plurality of voxels. Additional processes include determining diffuse illumination values for the plurality of vertices from the plurality of voxels in response to the diffuse illumination values for the surface points on the object, performing one or more low pass filter operations on the diffuse illumination values for the plurality of vertices to determine diffuse illumination compensation values for the plurality of vertices, and determining diffuse illumination compensation values for the surface points in response to the diffuse illumination compensation values for the plurality of vertices. Still other techniques include determining compensated diffuse illumination values for the surface points on the object in response to a weighted combination of the diffuse illumination values for the surface points and the diffuse illumination compensation values for the surface points.

According to another aspect of the invention, a computer system for rendering an object is described. One apparatus includes a memory configured to store a three-dimensional geometric description of an object. Another system includes a processor coupled to the memory, wherein the processor is configured to determine diffuse illumination values for surface points on the object, wherein the processor is configured to associate a three-dimensional grid comprising vertices and voxels with the object, wherein the processor is configured to map the surface points on the object to the voxels; wherein the processor is configured to determine diffuse illumination values associated with the vertices in response to diffuse illumination values associated with the surface points, wherein the processor is configured to perform one or more low pass filtering operations on the diffuse illumination values associated with the vertices to determine compensation values for the plurality of vertices, wherein the processor is configured to determine compensation values for the surface points in response to the compensation values for the plurality of vertices, and wherein the processor is configured to determine compensated diffuse illumination values for the surface points on the object in response to a weighted combination of the diffuse illumination values for the surface points and the compensation values for the surface points.

According to yet another aspect of the invention, a computer program product for computer system including a processor is described. One computer program product includes code that directs the processor to determine illumination values for surface positions on an object, code that directs the processor to associate a three-dimensional grid including vertices and voxels with the object, wherein the surface positions on the object are within a plurality of voxels, and code that directs the processor to determine illumination values for a plurality of vertices associated with the plurality of voxels in response to the illumination values for the surface positions on the object. Additional computer program product may include code that directs the processor to perform a plurality of directional low pass filtering operations on the illumination values for the plurality of vertices to determine compensation values for the plurality of vertices, code that directs the processor to determine compensation values for the surface positions on the object in response to the compensation values for the plurality of vertices, and code that directs the processor to form a weighted combination of the illumination values for the surface positions and the compensation values for the surface positions. In various embodiments, the codes reside on a tangible media, such as optical media, magnetic media, semiconductor media, organic media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
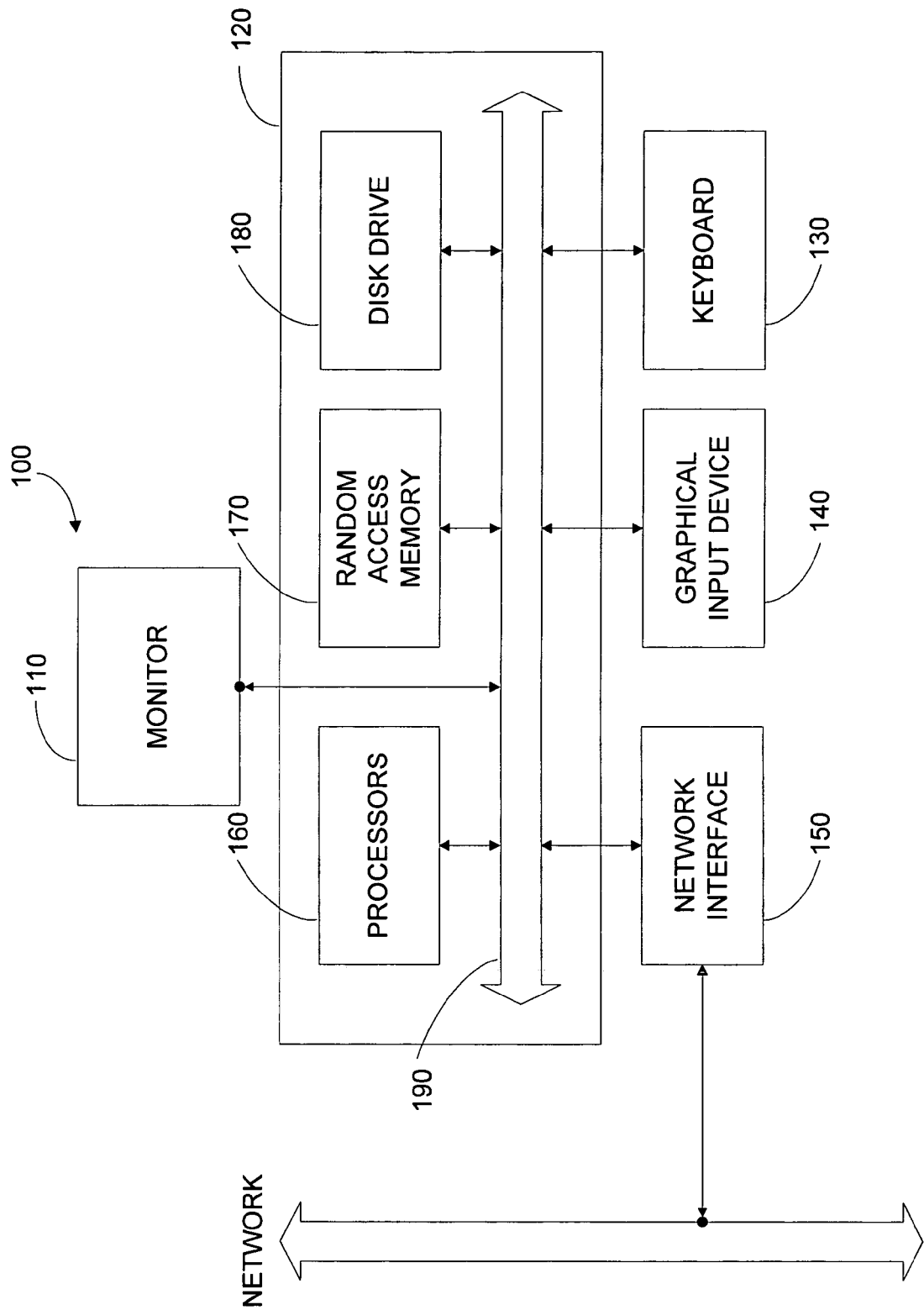
FIG. 1 illustrates a block diagram of a rendering system according to one embodiment of the present invention.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having multiple microprocessors such as Xeon™ microprocessor from Intel Corporation. Further, in the present embodiment, computer 120 typically includes a UNIX-based operating system.

RAM 170 and disk drive 180 are examples of tangible media for storage of data, audio/video files, computer programs, applet interpreters or compilers, virtual machines, embodiments of the herein described invention including geometric scene data, object data files, shader descriptors, a rendering engine, output image files, texture maps, displacement maps, scattering lengths and absorption data of object materials, and the like. Other types of tangible media include floppy disks, removable hard disks, optical storage media such as CD-ROMS and bar codes, semiconductor memories such as flash memories, read-only-memories (ROMS), battery-backed volatile memories, networked storage devices, and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as Pentium™ or Itanium™ microprocessors; AthlonXP™ microprocessors from Advanced Micro Devices, Inc; PowerPC G4™, G5™ microprocessors from Motorola, Inc.; and the like. Further, other types of operating systems are contemplated, such as Windows® operating system such as WindowsXP®, WindowsNT®, or the like from Microsoft Corporation, Solaris from Sun Microsystems, LINUX, UNIX, MAC OS from Apple Computer Corporation, and the like.

Figure 2A:
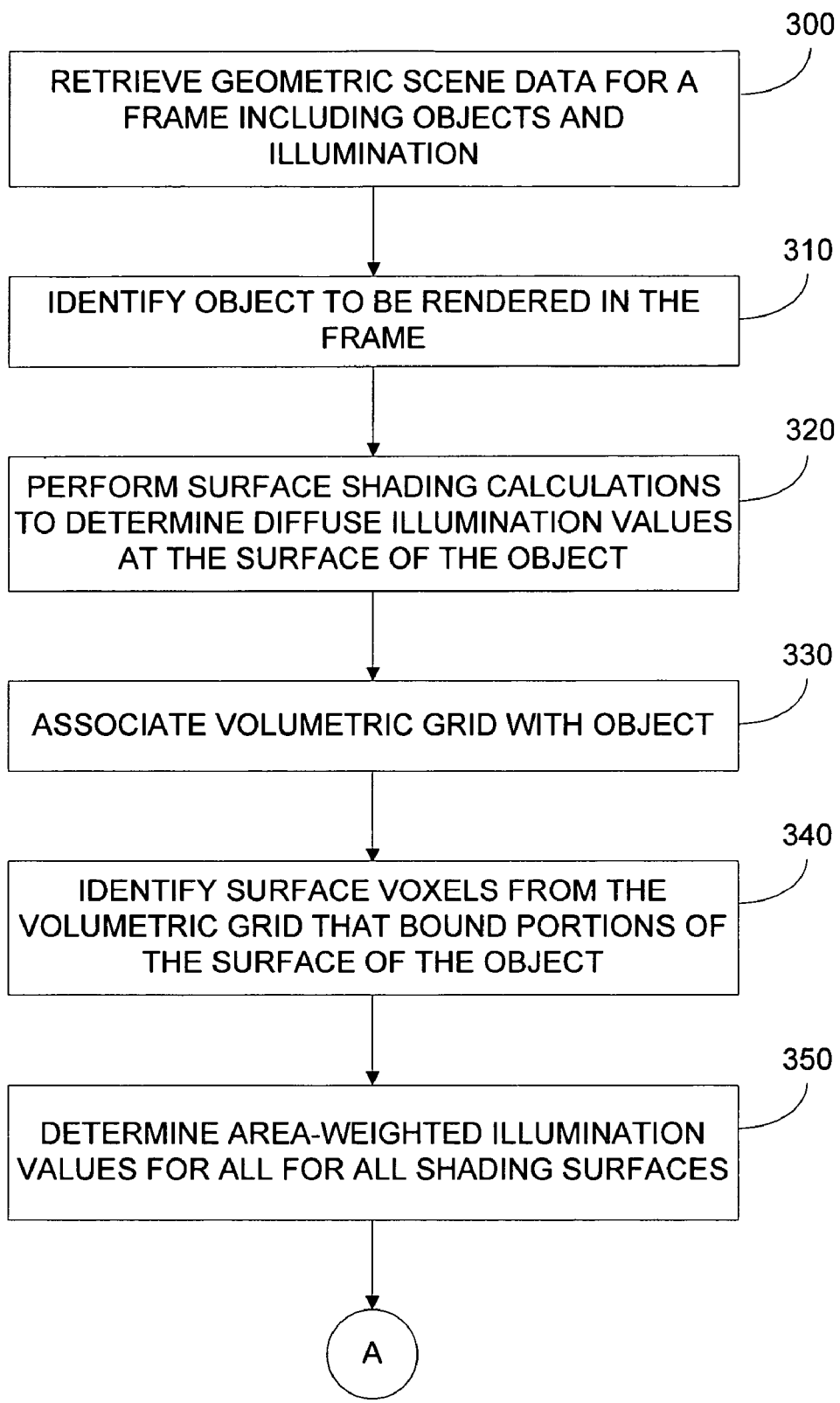
FIGS. 2A–C illustrate a block diagram of a flow process according to an embodiment of the present invention.
Figure 2B:
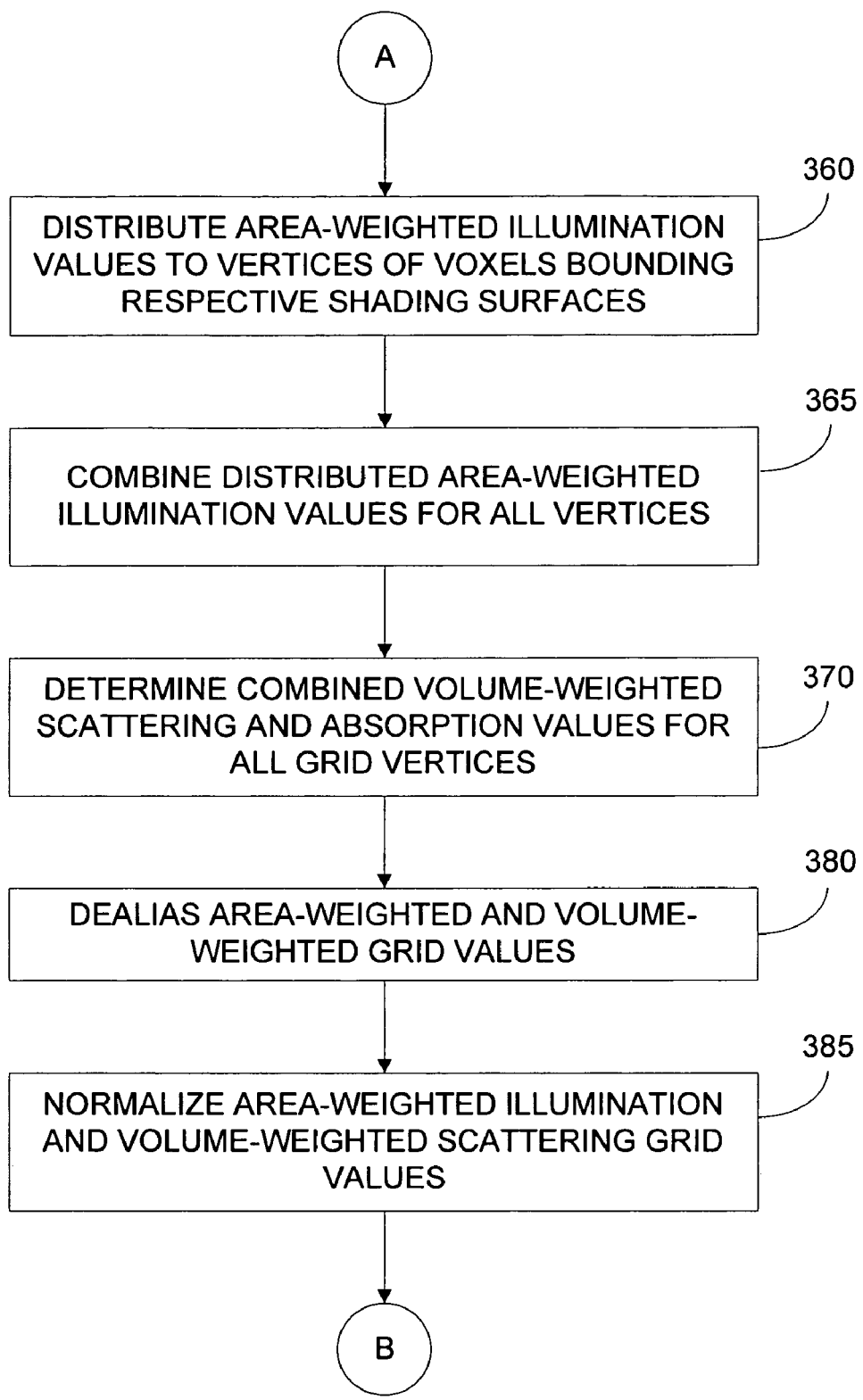
Figure 2C:
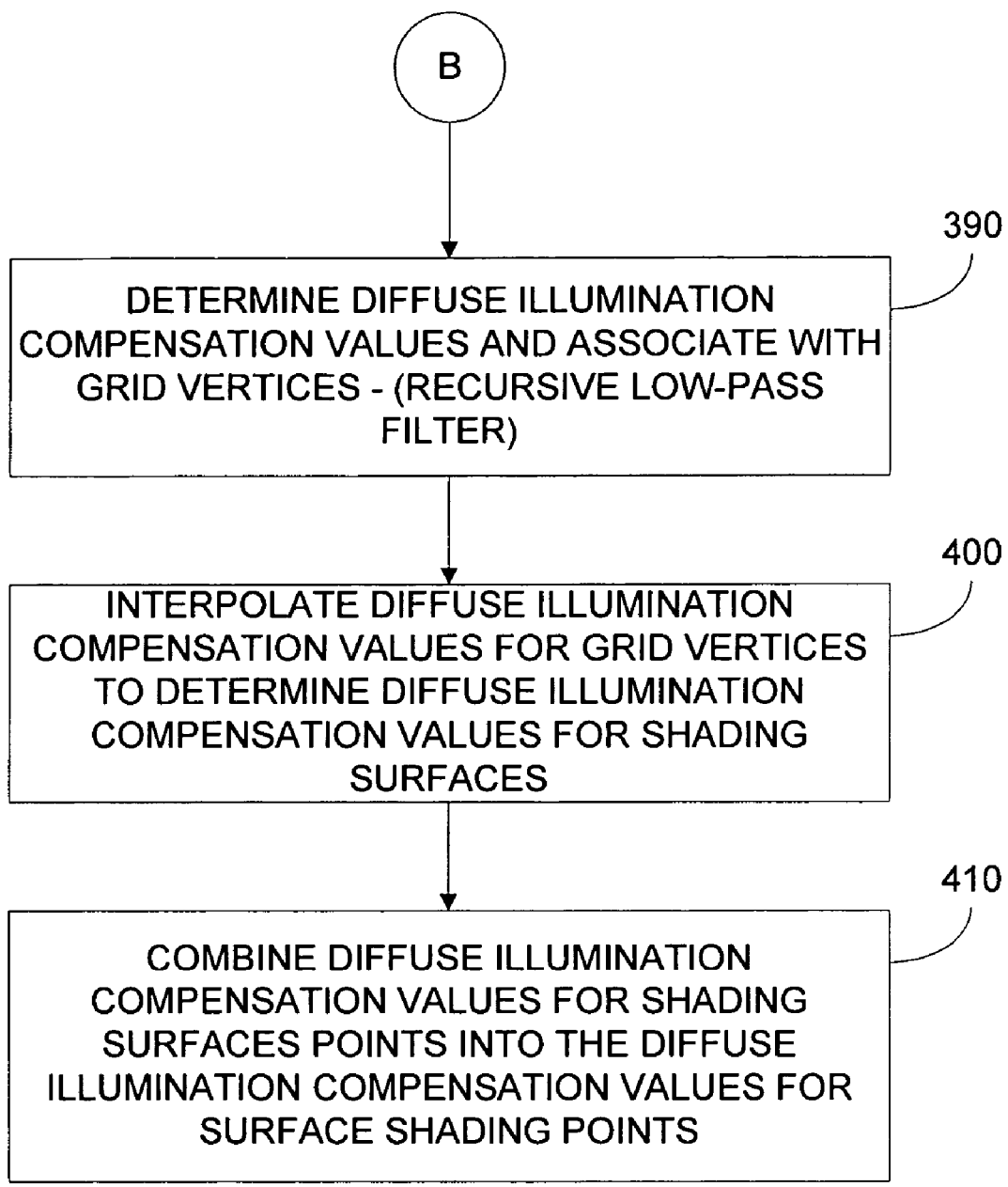

FIGS. 2A–C illustrates a block diagram of a flow process according to an embodiment of the present invention. More particularly, the block diagram discloses a process in which the material property of an object are considered as part of the shading process In one embodiment of the present invention, the process begins with the specification of an image to be rendered, step 200. In this example, image specification includes the specification of one or more scene backgrounds, the specifications of objects and textures in the images, the specification of lighting to be applied to the images, the specification of object placement data, the specification of animation parameters for objects in the scene, displacement maps, and the like. Typically, images are specified by one or more animators using conventional three-dimensional modeling techniques and software currently available. For example, software such as Alias|Wavefront's Maya™ Software, and the like may be used to specify the scene.

In the present examples, a specification of a background typically includes a geometric specification of a location or a "set" into which objects, described below, are placed. The geometric specification may include geometric boundaries, one or more "environment" maps, and the like. These environment maps may be static or may vary with time. In examples of the present invention, a set may represent any location where the objects are placed, such as a room, an interior location, an exterior location, or the like.

The objects are placed or positioned by the animator into the set. These objects may be in inanimate objects within a scene such as furniture, plants, vehicles, and the like. Additionally, these objects may be objects that move or are moved within the scene, for example, characters, chairs, doors, and the like. In the present embodiment, objects may be simple to complex, with some objects being formed from one or more smaller objects. In some embodiments, only portions of objects may be retrieved from a memory, and the remaining portions of the objects are dynamically created before being rendered. In such cases, the dynamically created objects are termed procedurally generated objects.

In the present embodiment, objects are typically stored separately from each other. That is, each object may be stored in its own file and be retrieved by a computer file system. In other embodiments of the present invention, data for more than one object may be included into a single file.

Each scene typically also includes a specification of light sources and lighting parameters. Lighting data may include light sources, light types (e.g. diffuse, point), lighting locations, lighting directions, and the like. This lighting data may be stored within a single file or multiple files.

Next, an object to be rendered is identified, retrieved from disk memory and then stored in program memory, step 310.

In one embodiment, streaming technology is used so that the rendering engine can begin processing the object, although the entire data file has not yet been completely retrieved by memory. In other embodiments, the rendering engine begins processing the object after it is retrieved from memory.

In the present embodiment, once the object is retrieved from disk memory, the surface of the object is shaded, step 320. Any number of conventional surface shading programs may used for this step, for example, RenderMan® software may be used to determining the surface shading for each light source. In one embodiment, the shading of the surface is determined for all lighting sources at the same time. In an alternative embodiment, the surface of the object is shaded individually for each light source. For example, if there are two light sources, there may be two separate shading values for each location on the surface of the object.

In this embodiment, a volumetric grid is then constructed to bound the entire object, step 330. In one example, the volumetric grid is Cartesian grid with approximately 200 to 500 vertices per side; accordingly the Cartesian grid may include from 8 million to 125 million voxels. The number of grid locations per side may be unequal and may vary, for example, a grid may be constructed to have 110 voxels in an x direction, 400 in a y direction and 500 in a z direction; thus the grid may include approximately 22 million voxels. In light of the present patent application, one of ordinary skill in the art would understand that the resolution of the volumetric grid in any direction and total number of voxels defined will vary according to specific engineering requirements and resources. In one embodiment, the voxels may be cubes, however in other embodiments, the voxels may have unequal dimensions and be irregular in shape.

In various embodiments of the present invention, multiple scattering grids may be used to bound an object. Use of a single rectangular volume can be inefficient to bound large and complex objects. For example, for humanoid characters, a single bounding box would include a large number of voxels that include empty space. As an example, areas between the legs, or between the arms and body would typically be empty. These empty voxels are defined and maintained in memory, however are not used. Additionally, depending upon how the object is composed of sub-components, the subsurface scattering effects of the different sub-components may be effectively independent. For example, diffuse illumination incident on the right hand of an object do not typically impact the subsurface scattering illumination on the left hand.

In various embodiments of the present invention, the multiple grids may be specific to the pose of the object. As an example, in a first pose an arm of a person is straight, and a single bounding box may be defined for the arm sub-component. However, in a second pose of the arm, the arm is bent at the elbow at 90 degrees. In such a case, if a single bounding box were used, many empty voxels would be allocated between the hand and the shoulder. Accordingly, in this example, two or more sub-grids may be allocated, including one sub-grid for the hand and forearm and one sub-grid-for the upper arm.

In various embodiments of the present invention, to reduce the amount of unused voxels computed, objects may first be separated into sub-components and then bounding boxes for the sub-components may be computed. Voxels in the smaller bounding boxes for the sub-components are then more likely to be used for scattering calculations, described below. An example, limbs of a humanoid may be bound within their own bounding boxes, and a torso may be bound within its own bounding box. According, the empty space between the arms and the body are not allocated. Additionally, such embodiments enable selective rendering of sub-components of an object. For example, the subsurface scattering illumination determinations may be performed on the head, but not the torso or legs for one or more scenes.

One issue that may arise as a result of the use of smaller bounding boxes is the potential of boundary mismatch or inconsistency at the boundaries. In various embodiments of the present invention, to address this issue, grids of sub-components are intentionally overlapped between boundaries with other sub-components. In various embodiments, the computed grid values in the transition area between the sub-components are smoothly (e.g. linearly) interpolated, or the like to reduce the mismatch.

In various embodiments of the present invention, the inventors have determined that often internal geometric elements in a object model interfere with sub-surface scattering techniques, such as that described below. More particularly, characters are often modeled with eye sockets or mouth "bag" voids in a model. In operation these internal geometric elements skew the sub-surface scattering computations. This skewing translates into unexpected local darkening or glowing of the surface, sometimes known as sparkles and pops.

In various embodiments of the present invention, these voids are ignored from the geometric model thus resulting in a less complex geometric model. For example, in one embodiment, a mouth "bag" and eye sockets may be removed from a head model, thus the geometry of the head model will become mostly convex. In the present embodiments, when mapping voxels to the geometric model, some voxels ("void voxels") will be associated with regions of the object where the voids were previously located. In another embodiment, the voids are tagged and ignored during the irradiance gathering step.

In various embodiments of the present invention, the diffuse illumination compensating values (e.g. subsurface illumination contributions), determined below, for these "void voxels" are then simply discarded and not used for shading purposes. Accordingly, the undesirable artifacts due to these voids are reduced.

In the present example, not all voxels will include a portion of the object or the surface of the object. For this embodiment, such voxels are ignored for the following calculations or discarded.

Next, the voxels that bound any portion of the surface of the object (surface voxels) are identified, step 340.

In the present embodiment, the vertices of each surface voxel that includes a surface portion of the object are associated with diffuse illumination values. The surface portions typically include shading surfaces (e.g. triangles) defined by shading values (diffuse illumination values) and associated shading areas. In this embodiment, the shading values typically include red, green, blue (RGB) shading components; and the shading areas typically represent an area of a respective shading surface.

In this embodiment, the size of shading areas are smaller than the grid spacing, accordingly, an area weighting operation is performed for each shading value, step 350.

Next, the area weighting values for each shading value are distributed to each of the 8 vertices in a voxel, step 360. In this embodiment, after each of the area-weighted shading values are distributed to the vertices, the contributions are added-up, step 365. In one embodiment, a typical vertex is associated with contributions of shading surfaces from different voxels.

Figure 3A:
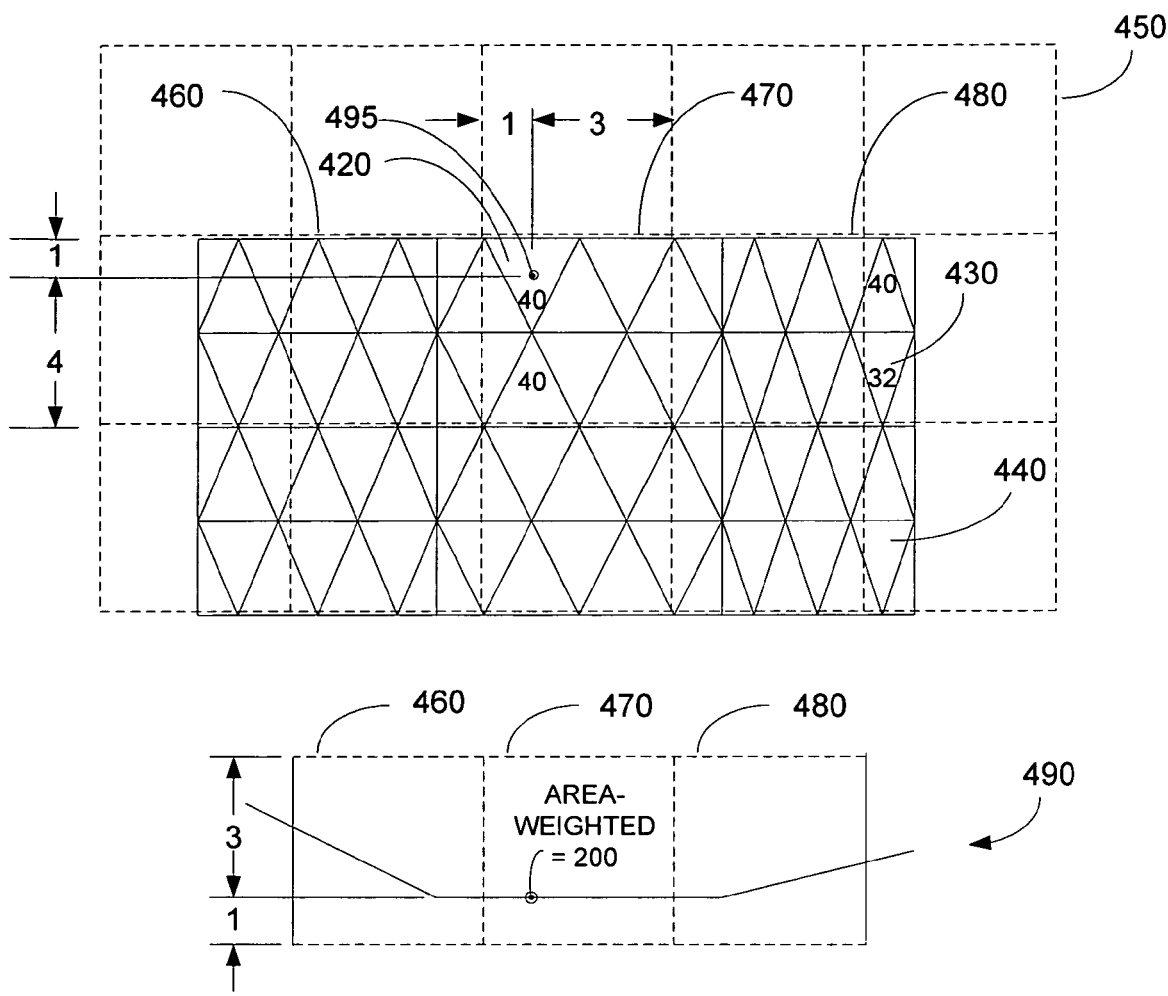
FIGS. 3A–B illustrate an example of an embodiment of the present invention.
Figure 3B:
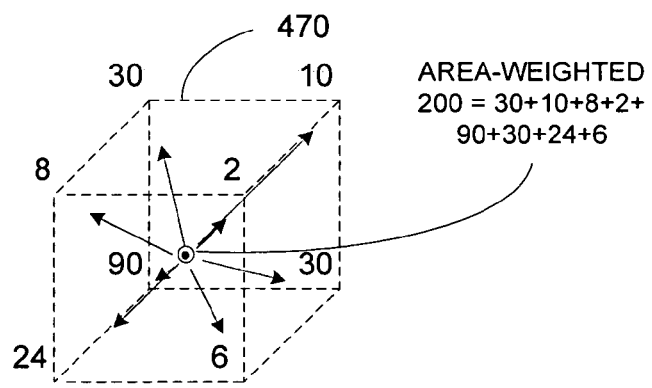

FIGS. 3A and 3B illustrate an example of one embodiment of the present invention. FIG. 3A illustrates a top view and a profile view of one example. In FIG. 3A a number of diffuse illumination values 430 and shading surfaces 440 (including shading surface 420) are illustrated with solid lines. On top of these values are voxel boundaries 450 illustrated with dotted lines (slightly offset up and to the left for clarity). In this embodiment, shading surfaces 440 are triangles, although in other embodiments, the shading surfaces may be triangles of different geometry and area, or different shapes (e.g. quadrilateral).

In this example, voxels 460, 470 and 480 are illustrated from the top and from the side in profile view in 490. In this example, the diffuse illumination value of shading surface 420 is assumed to be at the centroid 495 of shading surface 420. Further, as can be seen, centroid is location within voxel 470 ¼ the way from the closest corner 425, ⅕ the way in another direction, and ¼ in the third direction. Further, in this example, the diffuse illumination value is determined to be 40, and the surface area for shading surface 420 is 5 units.

In this example the area-weighted illumination value is (40×5=200) 200. The area-weighted illumination is then divided in a three to 1 ratio to the bottom corners. Thus the bottom corners divide 150 land the top corners divide 50. Next, based upon the position of centroid 495, these illumination values are further divided in approximately the way illustrated in FIG. 3B.

Figure 4A:
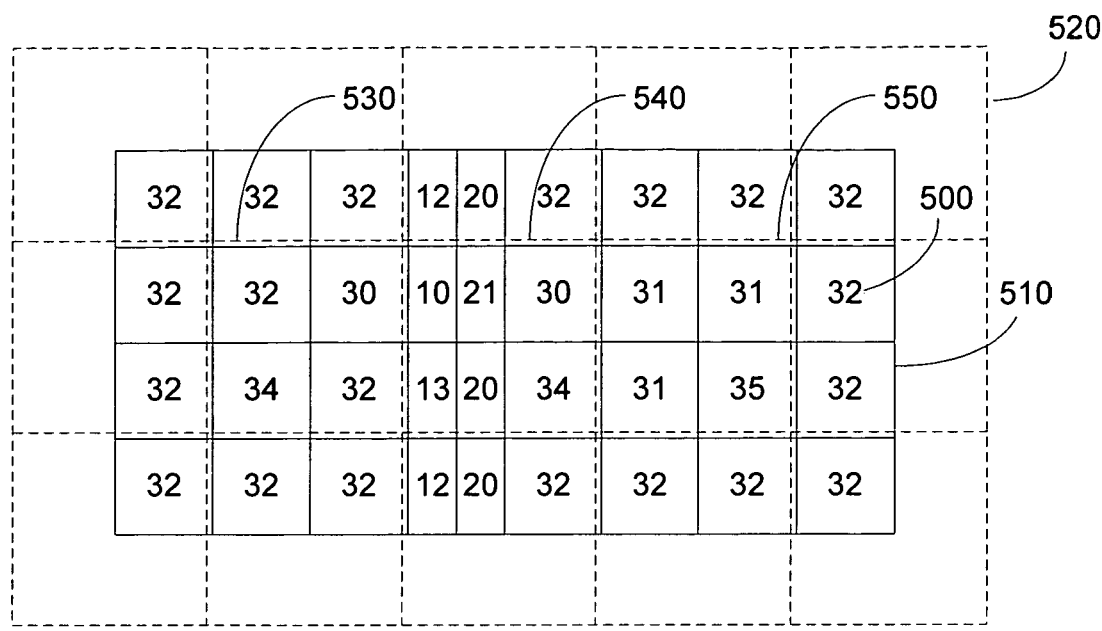
FIGS. 4A and 4B illustrates examples according to embodiments of the present invention.
Figure 4B:
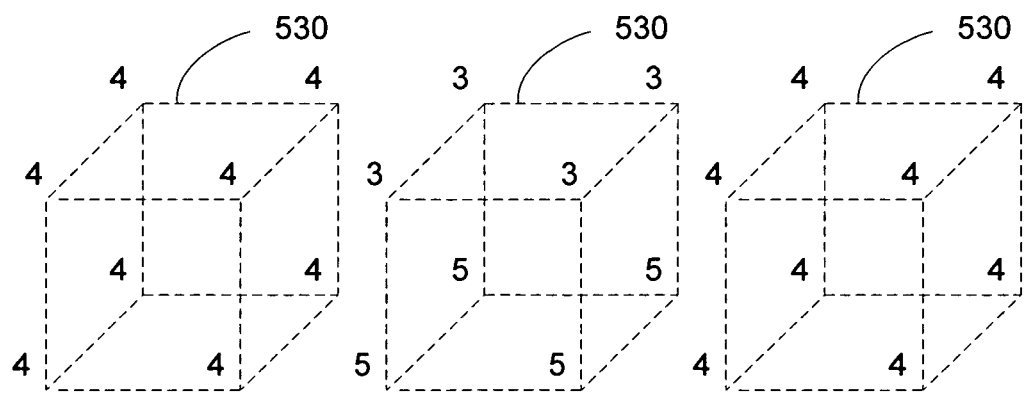

In other embodiments of the present invention, any other conventional method for distributing shading values to vertices of voxels is contemplated. For example, the area-weighted contribution for all shading surfaces may be determined once for the voxel, and that value is distributed to the eight vertices in the voxel, depending upon position. FIGS. 4A and 4B illustrates such an example.

FIG. 4A illustrates a top view and a profile view of one example. In FIG. 4A, a number of diffuse illumination values 500 and shading surfaces 510 are illustrated with solid lines. On top of these values are voxel boundaries 520 illustrated with dotted lines (slightly offset up and to the left for clarity). In this embodiment, shading surfaces 510 are squares of equal area, although in other embodiments, the shading surfaces may be quadrilaterals of different area.

In this example, voxels 530, 540 and 550 are illustrated including the shading surfaces and shading values shown. Also illustrated is a profile view 560 illustrating a location of the shading surfaces within voxels 530, 540, and 550. In this example, using area weighting calculations, the average illumination value in voxel 530 is illustrated as 32; the average illumination value in voxel 540 is 32, and the average illumination value in voxel 550 is 32. From the top view, the average illumination values are associated with the centers of the respective voxels, i.e. from the top, the average illumination values are assumed to be equidistant to the four respective corners of the voxels. From profile view 560, the average illumination values for voxels 530 and 550 associated with the center of the voxels, and are equidistant from the top and bottom corners, but the average illumination values for voxel 540 is associated with a position about 1.7 times closer to the bottom corners than the top corners.

As illustrated in FIG. 4B, the average diffuse illumination values are distributed to the respective vertices in voxels 530, 540, and 550 based upon the positions of the average illumination values, determined above. For voxels 530 and 550, the distribution to the top and bottom vertices is uniform. However, in this example, for voxel 540, because the illumination values are on the average, about 1.7 times closer to the bottom than to the top, the amount of illumination distributed to the bottom vertices (4×5=20) is about 1.7 times the amount of illumination distributed to the top vertices (4×3=12).

In the present embodiment, the above process is then typically repeated to distribute material properties values of the object onto the vertices. In the present embodiment, the material properties include attenuation factors and scattering lengths for the material bounded by respective voxels, step 370. Because the attenuation factors and scattering lengths are parameters of the material within the object, and not just on the surface, the process is performed for all voxels that include a portion of the object. In this embodiment, as a result, the material properties are mapped onto vertices of the voxels as a volume-weighted scattering length grid, and a volume-weighted attenuation factoring grid.

At this stage, a number of grids may be allocated and populated, for example, one grid to store weighted diffuse illumination values, one grid to store weighted attenuation factors, and one grid to store weighted scattering lengths. In other embodiments, additional grids may be allocated to stored additional values. In still another embodiment, only a single grid may be defined, and the weighted diffuse illumination values and weighted material properties are merely associated with that grid.

In the present embodiment, the diffuse illumination values, attenuation factors, and scattering lengths are color dependent. In this example, diffuse illumination values include a red component, a green component, and a blue component, however other color system may also be used. In one embodiment, the attenuation factors and scattering lengths are color dependent. As an example, for a green jade material, the scattering lengths of red and blue may be shorter in the material than the scattering length of green in the material. Accordingly, in the present embodiment, nine volumetric grids may be created and populated. In other embodiments, a single grid having vertices associated with multiple values may also be used.

The following steps are performed to efficiently simulate a scattering process of the translucent material. In the present embodiment, the process begins by processing the area-weighted diffuse illumination grid values, the volume-weighted scattering length grid values, and the volume-weighted attenuation factor grid values with a short range dealiasing filter per color step 380. In various embodiments of the present invention, the dealiasing filter may be a blur filter, or the like.

Next, in this embodiment, the area weighted diffuse illumination values, the volume-weighted scattering lengths, and volume-weighted attenuation factors are normalized, step 385. In one example, the area weighted diffuse illumination grid values are divided by a grid storing the areas of the respective voxels; and the volume-weighted scattering length grid values and the volume-weighted attenuation factor grid values are both divided by a grid storing the volumes of the respective voxels. In other embodiments, other types of normalizing filters may be used.

Embodiments of the present invention can simulate non-uniform materials within the object, such as bones, cartilage, metal, and the like with the variance across the grid. Very few organic elements are of homogeneous nature. Many translucent objects comport internal parts that occlude the light scattering inside. In the case of skin for instance, the underlying bone and muscle structure plays an important part in the subsurface scattering. Spatially varying the scatter length across the model surface however is one way to simulate this internal complexity. To this end, the irradiance gathering process also records a spatially varying tricolor (RGB) scatter length that is being provided by the surface shader.

In various embodiments of the present invention, the scattering length triad can be generated by any conventional shading methods, such as procedural texture, painted maps or a combination of both. As examples, a user may retrieve one or more two-dimensional views of a three-dimensional bone, a face, or the like in a two-dimensional paint program such as Adobe Photoshop® or the like. Next, the user paints the desired scattering length values in an overlay layer on top of the two-dimensional views. In various embodiments, the color and or intensity of the color is used to signify the desired scattering length values. For example, the scatter length is painted such that the "depth" of tissue is thinner in a forehead area of a face, and such that the "depth" of tissue is thicker on the cheeks of the face, and the like.

In such embodiments, the painted overlay layer becomes associated with the two-dimensional view of the bone, the face, or the like. In various embodiments of the present invention, at a later time, three-dimensional paint-projection techniques are subsequently used to map the overlay layer pixel values back to the three-dimensional object. Feathering techniques may also be used so that the scattering length values smoothly transition about the edges of the bone, face, or the like. In various embodiments of the present invention, multiple two-dimensional views of a three-dimensional object can be "painted" upon at the same time, as described in Application No. PCT/US04/16946 filed Mar. 23, 2004. That application is incorporated by reference for all purposes.

In various embodiments of the present invention, objects that make-up an object have scattering-lengths defined, as described above. As an example, the forearm includes skin and flesh with a first scattering length, and underlying bone with a second scattering length. These respective scattering lengths are then mapped to vertices of the volumetric illumination grids, described above.

Next, the diffuse illumination values are determined by solving the elliptic radiative transfer equation on the grid values:

$$\mu \nabla^2 D = I - \alpha D$$

In this equation, $\mu$ is a local scattering coefficient, $\alpha$ a is the local extinction coefficient, I is the source illumination from the surface, and D is the diffuse radiosity. In the present embodiment, $\mu$ and $\alpha$ (an extinction value) are derived from the attenuation factor grid values and the scattering length grid values; and I is derived from the diffuse illumination grid values. In this equation, $\alpha D$ represents the amount of illumination I absorbed, and $\mu \nabla^2 D$ represents the illumination flux.

Figure 10A:
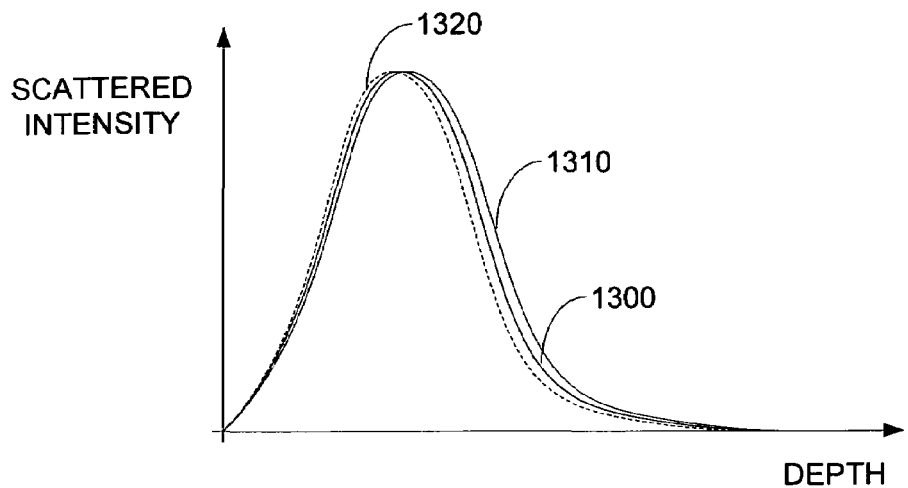
FIGS. 10A–C illustrate examples according to embodiments of the present invention.
Figure 10B:
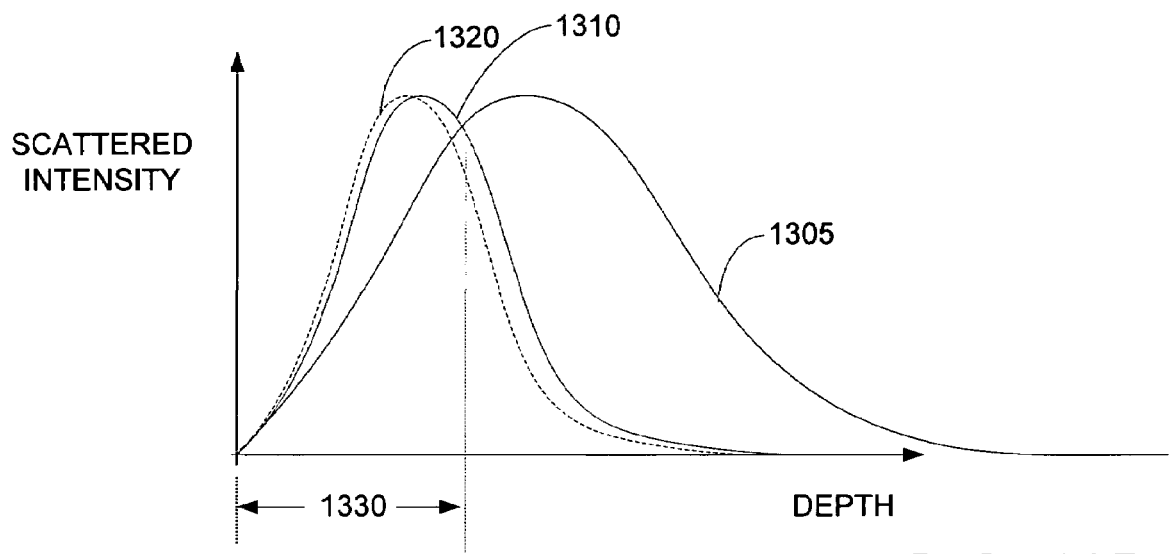
Figure 10C:
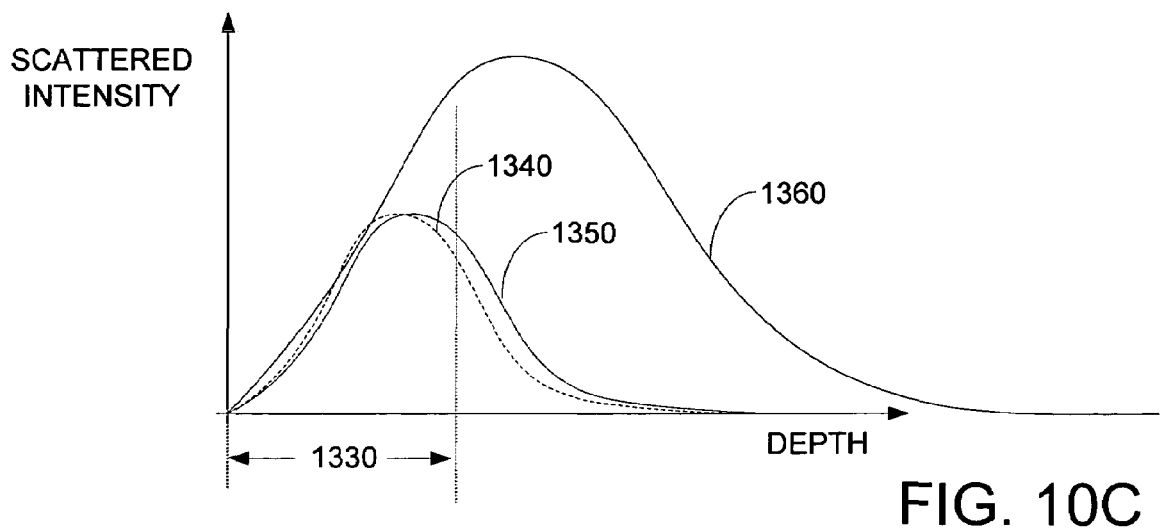

FIGS. 10A–C illustrate examples according to embodiments of the present invention. With embodiments of the present invention, to increase the amount of sub-surface scattering illumination (diffuse illumination compensation value) of a particular color, the scattering length of that color is increased compared to the other colors. For example, when an ear of a character is backlit, the ear should appear reddish. In this example, to implement this, the scattering length of red is increased relative to blue and green. FIG. 10A illustrates an initial amount of scattering with respect to distance, for each color component in this example, assuming equal input intensity for each color. In FIG. 10A, the scattering lengths of red 1300, blue 1310, and green 1320 are initially approximately the same. Next, in FIG. 10B, the scattering length of red 1305 is increased relative to blue 1310 and green 1320.

As a side effect of increasing the scattering length of red 1305, the inventors discovered that in region 1330, the amount of scattering of blue 1310 and green 1320 exceed the intensity of red 1305. Because of this, within region 1330, blue 1310 and green 1320 become the predominant color over red 1305. However, in embodiments of the present invention, it is typically desired that the color of light having the longest scattering length should also remain the predominant color through out the range of the object.

In various embodiments of the present invention, to address this issue, the extinction coefficients of the undesired colors are increased relative to the desired predominant color. As is known, extinction is commonly a sum of absorption and scattering. Because increasing the amount of scattering (decreasing scattering lengths) of blue 1310 and green 1320 would not change the fact that there would be a region where blue and green have higher scattering than red, the inventors adjust the absorption of blue 1310 and green 1320 of the material. As a result, as shown in FIG. 10C, by increasing the extinction coefficients (increasing the absorption) of the material in blue and green, the scattered intensity of blue 1340 and green 1350 remains lower than the intensity of red 1305 within region 1330. Accordingly, for a wide range of thicknesses, the subsurface scattering illumination effect would be predominately red.

In the present embodiment, the diffuse illumination values are determined by running a recursive low pass filter on the illumination grid values, step 390. In one embodiment, the recursive filter may be similar to the following equation:

$$Y(n) = I(n) + \alpha(n) Y(n-1)$$

In this equation, Y(n) represents a diffuse illumination compensation value at point n; I(n) represents the diffuse illumination value at point n; $\alpha$(n) represents an extinction value at point n; and Y(n−1) represents the diffuse illumination compensation value at point n−1. In this embodiment, $\alpha$(n) (derived from the scattering length and absorption values) varies across the grid.

In this embodiment, the recursive low pass filter is run upon the illumination grid values in six directions, for example, +x, −x, +y, −y, +z, −z directions. By doing this, the illumination values are effectively spread within the material to approximate the Green's function of the scattering operator ($\mu \nabla^2$), while also compensating for material having different scattering lengths. In this embodiment, the values for a are selected to simulate Green's function. More particularly, both the recursive low pass filter and Green's functions are both exponential, thus $\alpha$ is selected such that the low pass filter has approximately the same decay characteristics of Green's function. In the present embodiment, the change is $\alpha$ for adjacent samples is assumed to be small compared to the value of $\alpha$.

In other embodiments, other numerical methods for determining the diffuse illumination grid are contemplated. For example, a fast elliptic solver such as a fast convolution FFT solver or a multi-grid solver can be applied using the illumination grid values and scattering grid values, described above. In light of the present disclosure, one of ordinary skill in the art will recognize that other methods for solving for the diffuse illumination values can be used.

In the present embodiment, a result of this process is a diffuse illumination grid where the vertices are populated with diffuse illumination compensation values (scattering illumination values) resulting from the spreading of light within an object. More particularly, the diffuse illumination compensation values of surface voxels represent an amount of illumination to be added to the surface diffuse illumination values determined by the surface shader. For example, if an translucent object is thin and is back-lit, the surface shader may specify a low diffuse illumination value at surface. However, using the process described above, the total diffuse illumination value at the surface may be increased on account of the diffuse illumination compensation values determined above.

In the present example, the surface voxels determined above are again identified, and the diffuse illumination compensation values for vertices in the surface voxels are interpolated to determine diffuse illumination compensation factors for each surface sample, step 400. Any conventional interpolation process may be implemented. Next, the diffuse illumination compensation values are combined with the surface shading values (diffuse illumination values) determined by the shader, step 410. In various embodiments of the present invention, the combination may be any linear or non-linear combination of the two values. In the present embodiment, the resulting surface illumination values represent the appearance of the object illuminated by lighting sources compensated for the object material.

In various embodiments of the present invention, the inventors of the present invention have discovered that performing subsurface scattering of light in the method described in the above-referenced application may unintentionally soften fine geometric details on the surface of the object such as wrinkles, creases, bumps, and the like. To reduce such effects, weighted combinations of traditional surface shading values and subsurface scattering values are used to determine the final value for the surface.

In various embodiments, the respective combination of the diffuse illumination compensation factor (scattered light) and the diffuse illumination value (reflected light) for each surface sample, is based upon a weighting factor. In some embodiments, the weighting factor may be the same for all surface samples. As an example, the combined diffuse illumination values for all surface points are based upon 60% of the diffuse illumination values and 40% of the diffuse illumination compensation values, 75% and 25%, or any other proportion. In other embodiments, the weighting factors may be the same or different for the surface samples. For example, the combined diffuse illumination values for a first and a second surface point may be based upon a ratio of 3:1 of the diffuse illumination value to diffuse illumination compensation value, whereas a third surface point may be based upon a ratio of 1:5. In other examples, other proportions are contemplated.

In various embodiments, the weighting factors may be automatically (procedurally) determined, determined based upon input from a user, or a combination of these methods. In various implementations, the inventors of the present invention have discovered that in areas with fine geometric details, such as a corner of a mouth, crease of an eye, or the like, the diffuse illumination value should have a higher weight. Further, in areas with relatively little geometric fluctuations, such as a cheek or forehead, the sub-surface scattering (diffuse illumination compensation values) values may have a higher weight. In one embodiment, the system may automatically determine areas of the object with high and low geometric complexity. Then in areas of high geometric complexity, the system assigns a smaller weight to the surface points compared to surface points within areas of low geometric complexity. As a result, in areas of high geometric complexity, the percentage or ratio of the diffuse illumination compensation values compared to the diffuse illumination values are small compared to surface points within areas of low geometric complexity.

Figure 6:
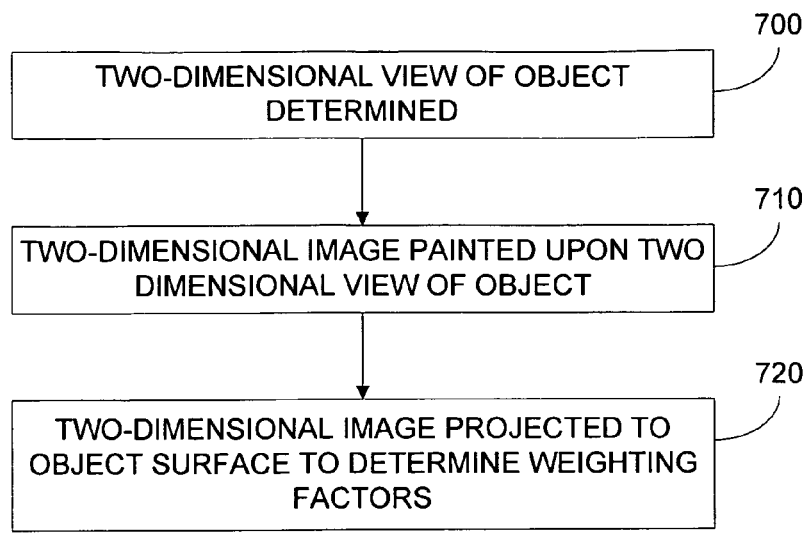
FIG. 6 illustrates a process according to an embodiment of the present invention.

In one embodiment, manual methods may also be used by a user to set weights for surface points. FIG. 6 illustrates a process according to an embodiment of the present invention. More specifically, FIG. 6 illustrates a paint-based method to set weights. Initially, a two-dimensional view of the three dimensional object is formed, step 700. In various embodiments, the views may be user-defined views, or predetermined views, such as a top view, front view, and the like. Next, using a two-dimensional paint-type program, a user "paints" a two-dimensional image in an overlay layer over the two-dimensional view, step 710. Any conventional paint-type program may be used, such as Adobe Photoshop, Jasc PaintShop Pro, or the like.

Next, in various embodiments, the two-dimensional image is projected back into three-dimensional space, step 720. Specifically, the pixel values in the two-dimensional image are projected back to surface positions of the object. Feathering techniques may be used to smooth the projection. Additionally, more than one two-dimensional view may be used for the paint-projection process. Further details regarding two-dimensional paint-based methods are disclosed in PCT/US04/08993 filed Mar. 23, 2004, incorporated by reference for all purposes.

In various embodiments, the pixel values in the two-dimensional image are then used to represent weighting factors for the surface positions, as discussed above in step 410. For example, in this method, the pixel values relate to the amount of the diffuse reflection and the amount of the sub-surface scattering values for the surface position. For instance a pixel value of 255 (selected from {0 . . . 255})indicates that the surface position includes only the diffuse reflection; a pixel value of 0 indicates that the surface position includes only the sub-surface scattering values; a pixel value of 128 indicates that the surface position includes approximately 50% of the diffuse reflection and 50% of the diffuse illumination compensation value, and the like.

Figure 7A:
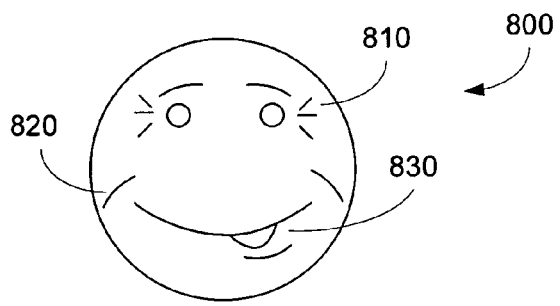
FIGS. 7A–B illustrate examples according to embodiments of the present invention.
Figure 7B:
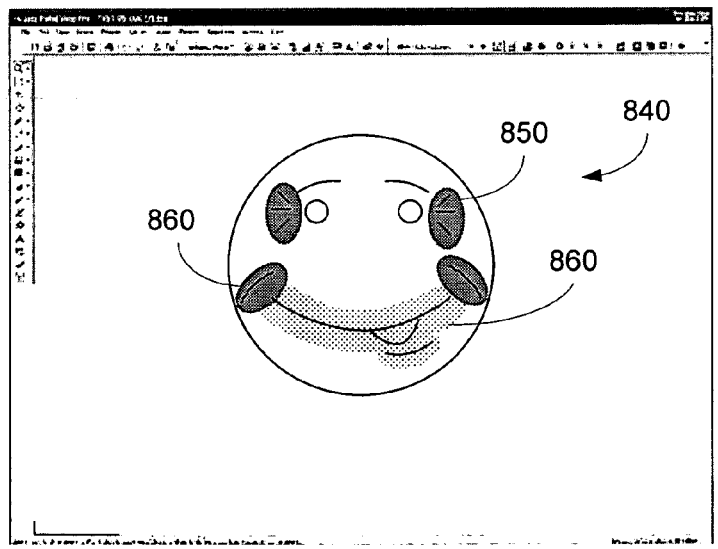

FIGS. 7A–B illustrate examples according to embodiments of the present invention. In FIG. 7A, a three-dimensional object 800 includes areas 810 and 820 of high geometric complexity, and a thinner area 830. In the embodiment in FIG. 7B, a two-dimensional view 840 of object 800 is opened within a paint-type program. In this example, a user paints in an overlay layer, geometric object 850 and 860. In the present embodiment, the value of the paint is associated with a low proportion of subsurface scattering values compared to the diffuse illumination. Additionally, in this example, the user paints geometric object 870. In the present embodiment, the value of the paint is associated with a high proportion of subsurface scattering values compared to the diffuse illumination. For portions of object 800 not associated with painted weight values, a default proportion of subsurface scattering values and diffuse illumination values, such as 50% each, may be set by the user.

According to the embodiment above, the paint values in the overlay layer are then mapped back to the three-dimensional model. Accordingly, paint values of geometric object 850 and 860 are then mapped back to areas 810 and 820, respectively; and paint values of geometric object 870 are mapped back to thinner area 830.

In other embodiments of the present invention, the inventors have discovered that in some regions of an object, the sub-surface scattering values may unintentionally "leak" light because of the geometry of the object. In such cases, instead of modifying and re-running the sub-surface scattering process, or providing an updated description of the geometric object and running the sub-surface scattering process, it is simpler to "ignore" the light leaks, by weighting the diffuse reflection values much higher than the sub-surface scattering values (e.g. 90% versus 10%), or the like in those areas.

In additional embodiments of the present invention, the inventors have recognized that the use of wavelength dependant scattering typically alters the hue of surface colors. However, this sometimes conflicts with the surface color and surface texture of an object that are painstakingly determined by one or more object modelers, artistic directors, or the like. Accordingly, the inventors have recognized that the use of sub-surface scattering illumination on surfaces, without regard to the surface color may conflict with the determined surface color. Although, using sub-surface scattering illumination as described above may result in a more technically accurate result, the inventors have determined that attempting to maintain the surface color is more important in various embodiments.

Figure 8A:
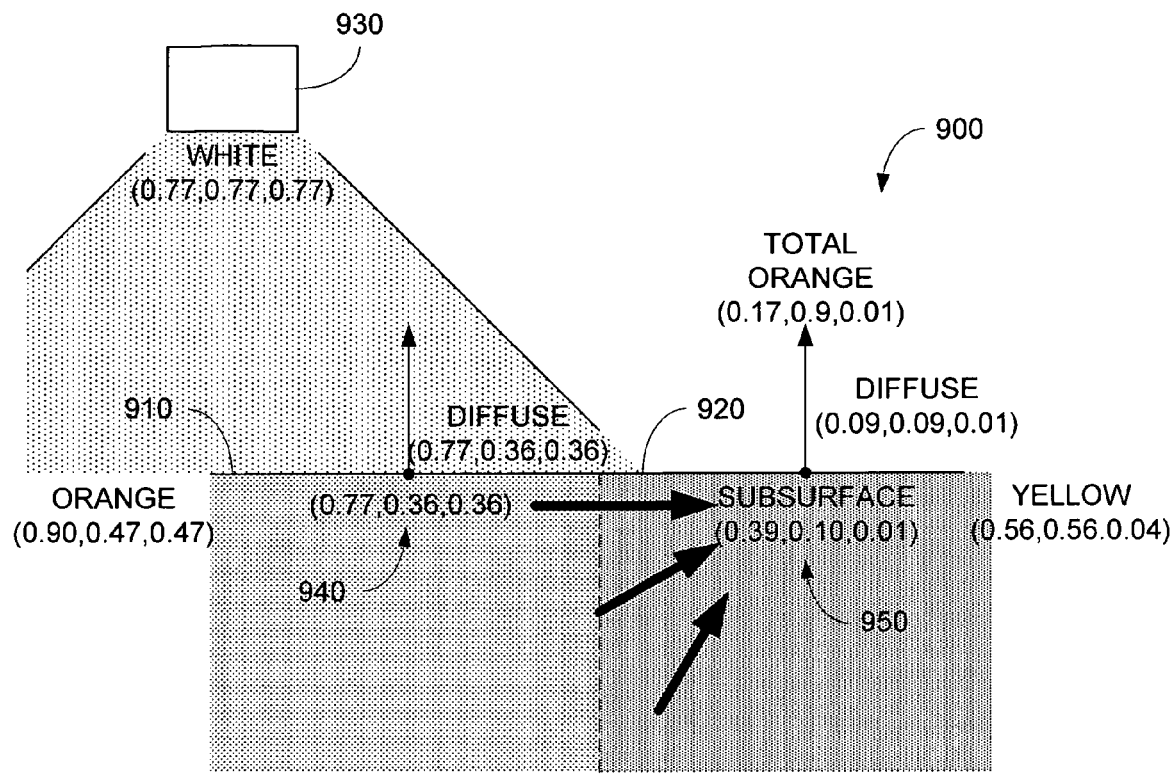
FIGS. 8A–B illustrate examples according to embodiments of the present invention.
Figure 8B:
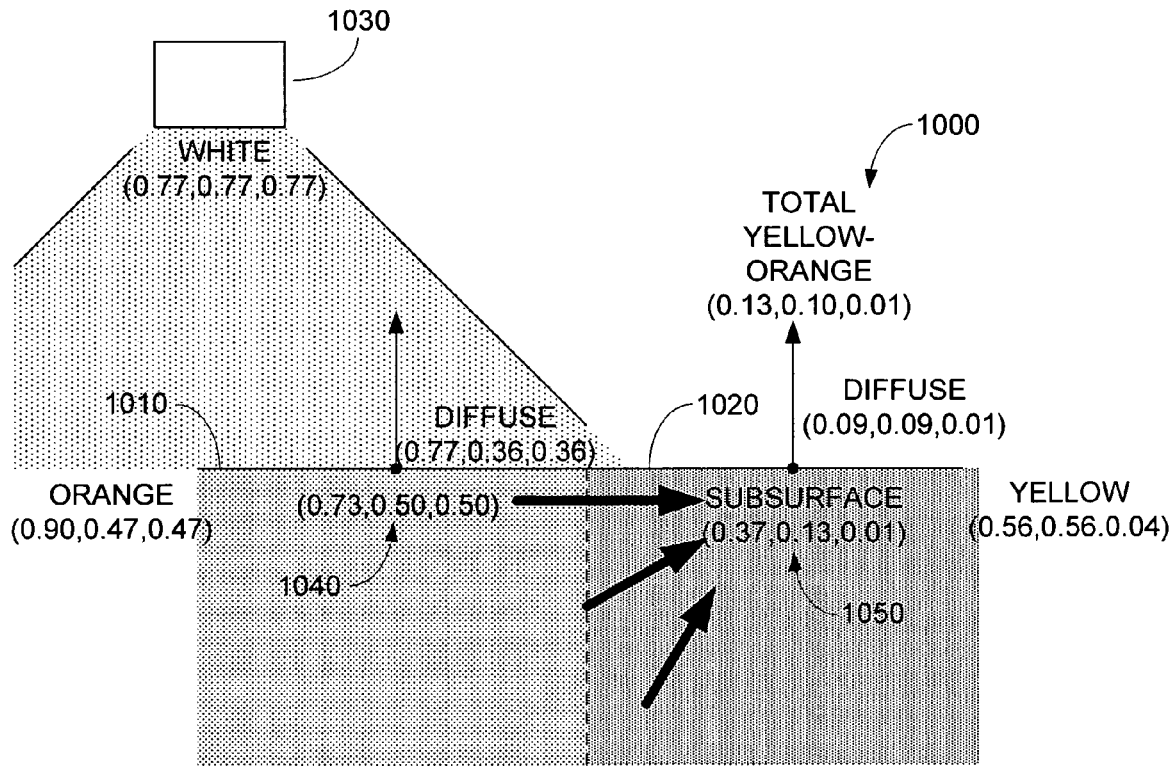

FIGS. 8A–B illustrate examples according to embodiments of the present invention. More specifically, FIG. 8A illustrates a two-dimensional cross-section of an object 900 having a first surface 910 of a orange-colored material (e.g. r,g,b=230,121,121 or r,g,b=(0.9,0.47, 0.47), and a second surface 920 that has a yellow-color material (e.g. r,g,b=144, 144,9 or r,g,b=.56, 0.56, 0.04). Also shown is an whitelight (e.g. r,g,b=196, 196, 196 or r,g,b=0.77, 0.77, 0.77) illumination source 930 primarily illuminating first surface 910. In this example, the diffuse illumination value at a surface point 940 is orange-ish (e.g. 0.77, 0.36, 0.36), and the diffuse illumination value at surface point 950 is dark yellow (e.g. 0.09, 0.09, 0.01).

According to one embodiment of the present invention, the diffuse illumination value (0.77, 0.36, 0.36) is used to perform the sub-surface scattering operation to determine diffuse illumination compensation values. In this example, at surface point 950, the diffuse illumination compensation value is (0.39, 0.01, 0.01). Then, assuming a weighted combination of 75% diffuse illumination value and 25% diffuse illumination compensation value at surface point 950, the compensated diffuse illumination value is approximately (0.17, 0.09, 0.01). As can be determined, this value is more orange than yellow in color, although second surface should be more yellowish in color.

In various embodiments of the present invention, in step 320 in FIG. 2A, in addition to determining the diffuse illumination values at surface positions on the object, the surface shading calculations include determining incident illumination at surface positions on the object. Additionally, the material colors at the surface positions may be known or determined through any number of shading techniques such as procedural textures or painted bitmap mappings.

Then, in various embodiments, prior to steps 350–400, the incident illumination at the surface positions are scaled by the respective material colors of the surface positions to determine a color for the scattering illumination calculations. In one specific embodiment, the incident illumination is multiplied by the square root of the input surface color and then scaled. As an example, using color values from 0 to 255, if the incident light is gray light (e.g. (r,g,b)=(196, 196, 196)), and the input surface color is bluish (e.g. 144, 144, 225), the incident light (196, 196, 196) is multiplied by a square root of the input surface color (e.g. 12, 12, 15) and then scaled. For example, if the scaling factor is 15, the resulting color for the scattering illumination calculation, the scattering illumination color is approximately (156, 156, 196), which is approximately blue in color. As discussed above, in various embodiments, steps 350–400 may then be individually performed for the separate component colors (e.g. r,g,b) because the object material may absorb or scatter the component colors at different rates.

In various embodiments of the present invention, after determining the illumination values at surface positions due to the subsurface scattering, the illumination values are scaled by the respective material colors of the output surface positions to determine a color for the diffuse illumination compensation values. Similar to the above, in one specific embodiment, the scattering illumination is multiplied by the square root of the output surface color and then scaled. As an example, if the value of the subsurface scattering at a surface point is yellowish in color (e.g. 100, 100, 10), and the material surface is greenish (9, 244, 100). In this example, the subsurface scattering value of (100 100, 10) is multiplied by a greenish value (e.g. 3, 12, 10) and then scaled. For example, if the scaling factor is 12, the resulting color for the illumination compensation value is approximately (25, 100, 83), which is greenish in color, matching the color of the material surface.

The above is merely an example of a process according to embodiments of the present invention. In one implementation the color values are scaled from 0 to 1. In such implementations, the resulting color values are different than when the color values are scaled from 0 to 255, or the like.

FIG. 8B illustrates a two-dimensional cross-section of an object 1000 similar to FIG. 8A. In this example, a first surface 1010 of a orange-colored material (e.g. r,g,b=0.9, 0.47, 0.47), and a second surface 1020 has a yellow-color material (e.g. r,g,b =0.56, 0.56, 0.04). Also shown is an white-light (e.g. r,g,b=0.77, 0.77, 0.77) illumination source 1030 primarily illuminating first surface 1010. In this example, the diffuse illumination value at a surface point 1040 is orange-ish (e.g. 0.73, 0.50, 0.50), and the diffuse illumination value at surface point 1050 is also dark yellow (e.g. 0.56, 0.56, 0.01).

According to one embodiment of the present invention, illumination source 1030 (0.77, 0.77, 0.77) is a multiplied with the square root of the orange-colored material: (0.95, 0.69, 0.69) to obtain the illumination value (0.73, 0.50, 0.50). After the sub-surface scattering operation, the subsurface scattering value at point 1050 is (0.37. 0.13, 0.01). According to the above embodiment, this value is then multiplied by the square root of the yellow-colored material: (0.56, 0.56, 0.56), to obtain the diffuse illumination compensating value is (0.28, 0.10, 0.01).

Next, assuming a weighted combination of 75% diffuse illumination value and 25% diffuse illumination compensation value at surface point 1050, the compensated diffuse illumination value is approximately (0.13, 0.10, 0.01). In the present example, the value of (0.13, 0.10, 0.01) is more yellow than the value of (0.17, 0.09, 0.01) determined for surface point 950, in FIG. 8A.

Figure 9A:
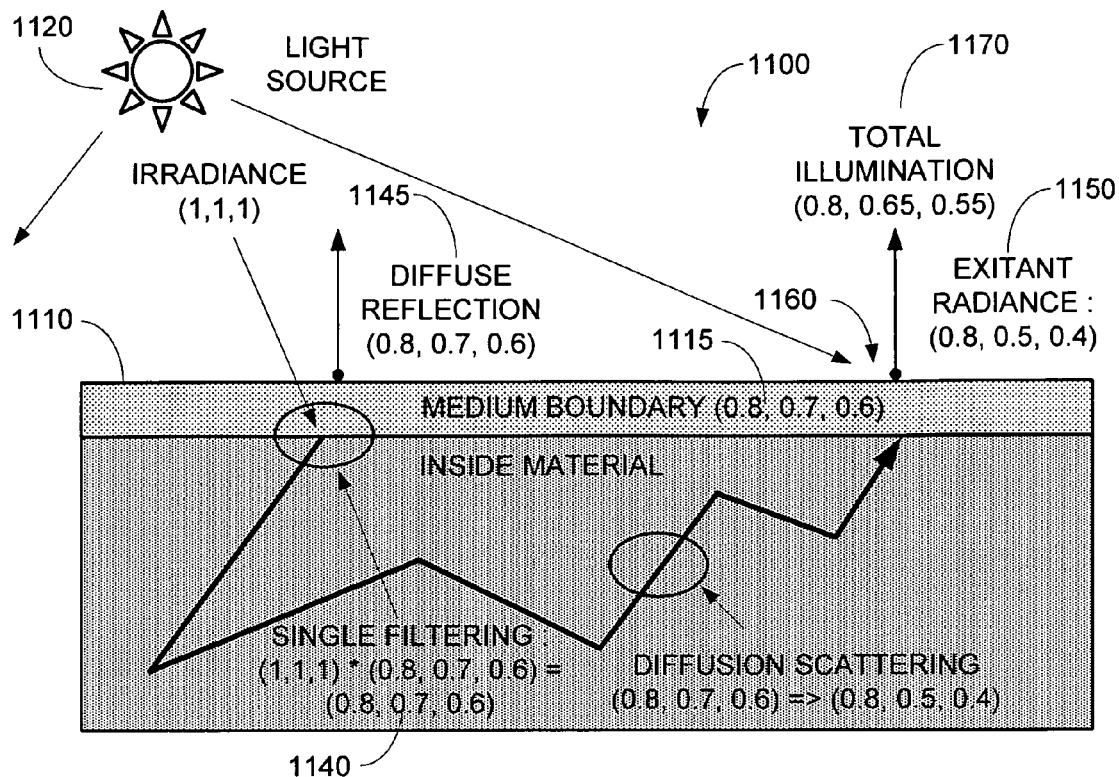
FIGS. 9A–B illustrate additional examples according to embodiments of the present invention.
Figure 9B:
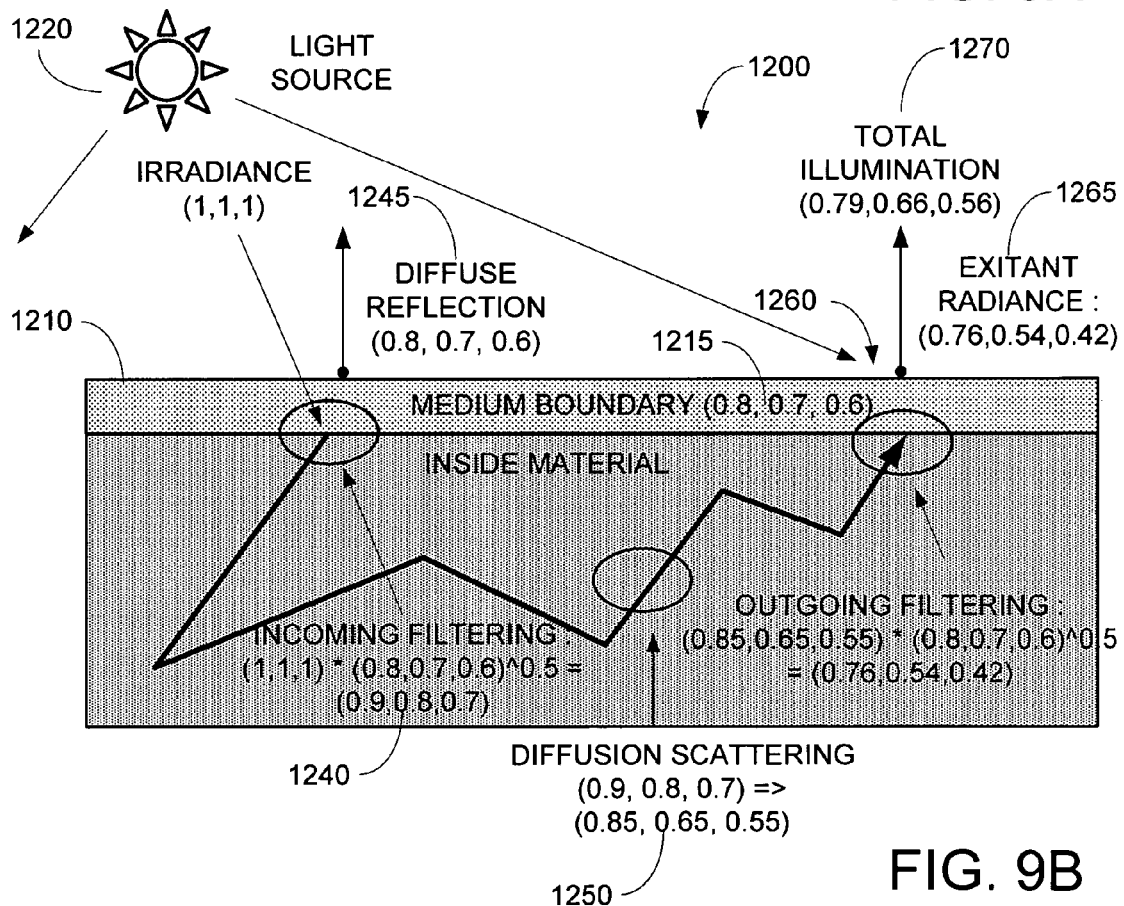

FIGS. 9A–B illustrate additional examples according to embodiments of the present invention. More specifically, FIG. 9A illustrates a two-dimensional cross-section of an object 1100 having a surface 1110 of a given color 1115 (e.g. r,g,b=0.8, 0.7, 0.6 from a range for each of {0 to 1}). Also shown is an white-light (e.g. 1.0, 1.0, 1.0) illumination source 1120 primarily illuminating first surface 1110. In this example, the initial diffuse illumination 1140 for the sub-surface scattering effect (e.g. 0.8, 0.7, 0.6) and a diffuse reflection 1145 is shown (e.g. 0.8, 0.7, 0.6). After subsurface scattering computations, the diffuse illumination compensation value (scattering illumination) 1150 at surface point 1160 is determined, (e.g. 0.8, 0.5, 0.4). Next, assuming a weighted combination of 75% the initial diffuse illumination value 1140 and 25% of a diffuse reflection (in this example, the same as diffuse reflection 1145) at surface point 1150, the compensated diffuse illumination value (combination of diffuse reflection and sub-surface scattering value) 1170 is determined (e.g. 0.8, 0.65, 0.55). As can be determined, this value 1170 is more red than the original given color 1115 (e.g. 0.8, 0.7, 0.6).

FIG. 9B illustrates a two-dimensional cross-section of an object 1200 having a surface 1210 of a given color 1215 (e.g. r,g,b=0.8, 0.7, 0.6 from a range for each of {0 to 1 }). Also shown is an white-light (e.g. 1.0, 1.0, 1.0) illumination source 1220 primarily illuminating first surface 1210. In this example, the diffuse reflection 1245 is shown (e.g. 0.8, 0.7, 0.6), and the initial diffuse illumination 1240 for the sub-surface scattering effect is shown (e.g. 0.9, 0.8, 0.7) after multiplied by the square root of the given color 1215. After sub-surface scattering computations, scattering illumination contribution 1250 is determined, (e.g. 0.85, 0.65, 0.55). As can be seen, the scattering illumination contribution is multiplied by the square root of the given color 1215, to obtain the diffuse illumination compensation value 1265 at point 1260. Next, assuming a weighted combination of 75% the diffuse reflection 1255 (in this example, same as diffuse reflection 1245: (0.8, 0.7, 0.6) and 25% of the diffuse illumination compensation value 1265 at surface point 1260, the compensated diffuse illumination value (combination of diffuse reflection and sub-surface scattering value) 1270 is determined (e.g. 0.79, 0.66, 0.56). As can be determined, this value 1270 is more similar to the original given color 1215 (e.g. 0.8, 0.7, 0.6), compared to compensated diffuse illumination value 1270 (e.g. 0.8, 0.65, 0.55).

In the foregoing specification, the invention has been described with reference to specific exemplary embodiments thereof. Many changes or modifications are readily envisioned. For example, some embodiments of the present invention allow the user to simulate scattering of light in a material in a non-uniform manner. This is also known as anisotropic scattering. Typically, the irradiance gathering stage discards the directionality of incident light intensities, accordingly, scattering directionality is impossible. However, it is possible to achieve some amount of scattering directionality by recording the irradiance samples at surface locations and moving the values along the vector defined by the incident light sources to the surface locations.

In the various embodiments, to simulate this process, the diffuse illumination values are modified within the illumination grid prior to the scattering phase, described above. More specifically, the diffuse illumination values determined at voxels bounding surface points may be moved forward into the object or moved backward outside the object between steps 360 and 365.

Figure 5A:
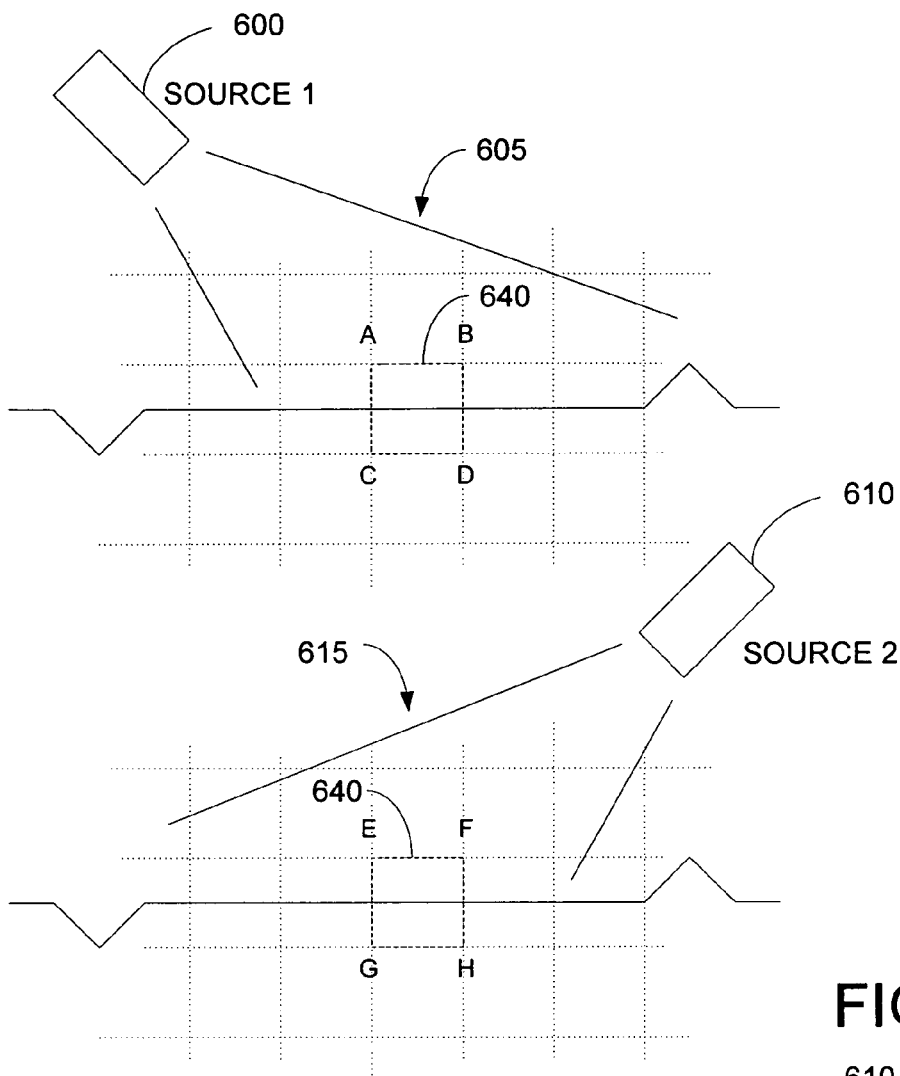
FIGS. 5A and 5B illustrate examples according to embodiments of the present invention.
Figure 5B:
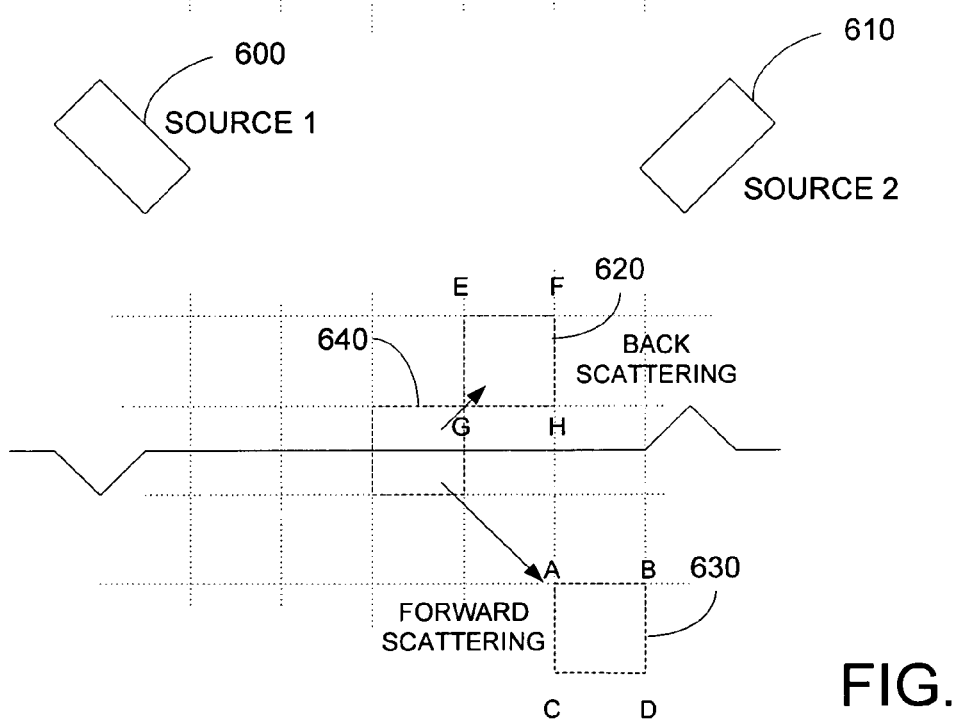

FIGS. 5A and 5B illustrate examples according to embodiments of the present invention. In the example in FIG. 5A, diffuse illumination values 605 due to lighting source 600 for each vertex in the voxel 640 are shown. Additionally, diffuse illumination values 615 due to lighting source 610 for each vertex in voxel 640 are also shown. An illumination grid 650 representing voxels discussed above is also shown.

In FIG. 5B, forward scattering is illustrated with voxel 630. As can be seen, the diffuse illumination values 605 due to lighting source 600 are moved from voxel 605 to voxel 630. In the various embodiments, the distance of voxel 630 from 605 in the direction away from illumination source 600 is typically estimated by a user, based upon the properties of the object material. For example, if the object material is more translucent in the direction of the light, the offset is deeper into the object; and if the object material is less translucent in the direction of the light, the offset is shallower into the object.

In FIG. 5B, reverse scattering is illustrated with voxel 620. As can be seen, the diffuse illumination values 615 due to lighting source 610 are moved from voxel 605 to voxel 620. In the various embodiments, the distance of voxel 630 from 620 in the direction towards illumination source 600 is typically estimated by a user, based upon the properties of the object material. For example, if the object material is more opaque in the direction of the light, the offset is further away from the object; and if the object material is less opaque in the direction of the light, the offset is closer to the object.

In various embodiments of the present invention, after compensating for forward scattering for all light sources, as shown, for example in FIG. 5B, steps 365–410 may be performed, as previously discussed.

In various embodiments of the present invention, the inventors have determined that advantages of the present schema may be applied to various rendering pipelines. For example, some embodiments may be combined with the existing RenderMan® Reyes rendering architecture. Other embodiments may also be combined with the shot rendering techniques described in the above-referenced application. Further, it is envisioned that a great number of shaders currently compatible with RenderMan® could be used in various embodiments of the present invention.

In some embodiments of the present invention, the sub-surface scattering effects discussed above, may or may not be desired for all renderings of a scene. For example, in some embodiments, the generation of these effects may be more time consuming than desired by a user, i.e. they may not be real-time processes. Accordingly, in some embodiments, one or more switches may be included in the rendering pipeline that bypasses the techniques described above.

In various embodiments of the present invention, switching on and off of the subsurface scattering effects described above may be made on different levels of granularity. For example, scattering effects may be switched on or off for different parts of object models, different object models, different scenes, different shots, and the like. Additionally, the switches may allow the user to globally determine a percentage of scattered illumination contributions and diffuse illumination contributions.

In some embodiments, a simpler simulation of the sub-surface scattering process may be used to provide an approximation of the subsurface scattering, when the techniques described above are turned off. For example, a diffuse reflection in the illumination model may be used. As another example, the techniques described in U.S. patent application Ser. No. 10/810,064 filed Mar. 25, 2004 may be used.

Embodiments of the present invention may be applied to any number of rendering platforms and for a variety of purposes. For example, embodiments may be use on engineering workstations for development purposes, on visualization systems for artists and animators, in a rendering farm machine for final production, and the like. Accordingly, the concepts disclosed above are extremely valuable in a variety of applications.

In the above disclosure, any resolution for the grids may be used. The inventor has determined that it is advantageous that the grid be larger than the smallest shaded surface.

Further, the grid may be much greater in size. In one embodiment, a typical voxel may include two shading surface values to nine shading surface values. In other embodiments, voxels may include a smaller number of shading surface values, e.g. 0.5 or greater, and voxels may include a larger number of shading surface values, e.g. 10 to 25, 20 to 40, 30 or greater, and the like.

Further embodiments can be envisioned to one of ordinary skill in the art after reading the attached documents. In other embodiments, combinations or sub-combinations of the above disclosed embodiments can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method for rendering an object comprises:
   determining diffuse illumination values for surface points on the object;
   associating a three-dimensional grid with the object, wherein the three-dimensional grid includes a plurality of vertices, wherein the plurality of vertices define a plurality of voxels, and wherein each voxel includes at least a portion of the object;
   mapping surface points on the object to a plurality of voxels;
   determining diffuse illumination values for the plurality of vertices from the plurality of voxels in response to the diffuse illumination values for the surface points on the object,
   performing one or more low pass filter operations on the diffuse illumination values for the plurality of vertices to determine diffuse illumination compensation values for the plurality of vertices;
   determining diffuse illumination compensation values for the surface points in response to the diffuse illumination compensation values for the plurality of vertices;
   determining compensated diffuse illumination values for the surface points on the object in response to a weighted combination of the diffuse illumination values for the surface points and the diffuse illumination compensation values for the surface points and
   displaying an image on a display, wherein the image includes an appearance of at least a portion of the object determined in response to at least some of the compensated diffuse illumination values for the surface points.

2. The method of claim 1 wherein determining the compensated diffuse illumination values for the surface points on the object comprises:
   determining weighting factors associated with each of the surface points; and
   determining the compensated diffuse illumination values for the surface points on the object in response to the diffuse illumination values for the surface points, in response to the diffuse illumination compensation values for the surface points, and in response to the weighting factors associated with the surface points, respectively.

3. The method of claim 2 wherein determining the compensated diffuse illumination values for the surface points on the object comprises performing a weighted combination of the diffuse illumination values for the surface points and diffuse illumination compensation values for the surface points, in response to the weighting factors associated with the surface point.

4. The method of claim 2 wherein the weighting factors associated with each of the surface points is determined in response to input from a user.

5. The method of claim 4 wherein the weighting factors associated with each of the surface points is determined using two-dimensional paint projection techniques.

6. The method of claim 2 wherein a first set of surface points on the object at locations of finer geometric features are associated with smaller weighting factors compared to weighting factors of a second set surface points on the object at locations of coarser geometric features.

7. The method of claim 6
   wherein at a surface point in the first set of surface points on the object at locations of finer geometric features, a diffuse illumination value and a diffuse illumination compensation values are combined in a first proportion;
   wherein at a surface point in the second set of surface points on the object at locations of coarser geometric features, a diffuse illumination value and a diffuse illumination compensation values are combined in a second proportion; and
   wherein the first proportion is larger than the second proportion.

8. The method of claim 2 further comprising:
   determining an image in response to the compensated diffuse illumination values for the surface points; and
   storing the image.

9. An image rendered according to the method described in claim 8.

10. An computer system comprises:
    a memory configured to store a geometric description of an object;
    a processor coupled to the memory, wherein the processor is configured to determine diffuse illumination values for surface points on the object, wherein the processor is configured to associate a three-dimensional grid comprising vertices and voxels with the object, wherein the processor is configured to map the surface points on the object to the voxels; wherein the processor is configured to determine diffuse illumination values associated with the vertices in response to diffuse illumination values associated with the surface points, wherein the processor is configured to perform one or more low pass filtering operations on the diffuse illumination values associated with the vertices to determine compensation values for the plurality of vertices, wherein the processor is configured to determine compensation values for the surface points in response to the compensation values for the plurality of vertices, and wherein the processor is configured to determine compensated diffuse illumination values for the surface points on the object in response to a weighted combination of the diffuse illumination values for the surface points and the compensation values for the surface points.

11. The computer system of claim 10
    wherein the processor is configured to determine weighting factors associated with each of the surface points; and wherein the processor is configured to determine the compensated diffuse illumination values for the surface points on the object in response to the diffuse illumination values for the surface points, in response to the compensation values for the surface points, and in response to the weighting factors associated with each of the surface points, respectively.

12. The computer system of claim 11 wherein the processor is configured to perform a weighted combination of the diffuse illumination values for the surface points and the compensation values for each of the surface points, in response to the weighting factors associated with the surface points.

13. The computer system of claim 11 wherein the processor is also configured to determine the weighting factors associated with each of the surface points in response to a two-dimensional image.

14. The computer system of claim 11 wherein the processor is configured to determine locations on the object having high-detail geometric features, and to determine locations on the object having low-detail geometric features.

15. The computer system of claim 14 wherein a first surface point on the object at a location having high-detail geometric features is associated with a first weighting factor;
wherein a second surface point on the object at a location having low-detail geometric features is associated with a second weighting factor; and
wherein the second weighting factor is greater than the first weighting factor.

16. A computer program product for a computer system including a processor comprises:
code that directs the processor to determine illumination values for surface positions on an object;
code that directs the processor to associate a three-dimensional grid including vertices and voxels with the object, wherein the surface positions on the object are within a plurality of voxels;
code that directs the processor to determine illumination values for a plurality of vertices associated with the plurality of voxels in response to the illumination values for the surface positions on the object;
code that directs the processor to perform a plurality of directional low pass filtering operations on the illumination values for the plurality of vertices to determine compensation values for the plurality of vertices;
code that directs the processor to determine compensation values for the surface positions on the object in response to the compensation values for the plurality of vertices;
code that directs the processor to form a weighted combination of the illumination values for the surface positions and the compensation values for the surface positions; and code that directs a processor to display an image on a display, wherein the image includes an appearance of at least apportion of the object determined in response to at least some compensation values for the surface positions;
wherein the codes reside on a computer readable tangible media.

17. The computer program product of claim 16 wherein code that directs the processor to form a weighted combination of the illumination values for the surface positions and the compensation values for the surface positions comprises code that directs the processor to form a weighted combination of the illumination values for the surface positions and the compensation values for the surface positions, in response to weighting values for the surface positions.

18. The computer program product of claim 17 wherein the surface positions are associated with a single weighting value.

19. The computer program product of claim 17
wherein a first surface position is associated with a first weighting value;
wherein a second surface position is associated with a second weighting value; and
wherein the first weighting value and the second weighting value are selected from the group consisting of: same, different.

20. The computer program product of claim 17 further comprising code that directs the processor to determine the weighting values for the surface positions in response to a three-dimensional paint-projected image.

21. The computer program product of claim 17 wherein the weighting values for the surface positions are determined in response to user input.

22. The computer program product claim 17 further comprising:
code that directs the processor to determine a first surface region of the object having a higher geometric complexity;
code that directs the processor to determine a second surface region of the object having a lower geometric complexity;
code that directs the processor to determine a first weighting value for the first surface region; and
code that directs the processor to determine a second weighting value for the second surface region;
wherein the first weighting value and the second weighting value are different.

* * * * *